United States Patent
Jakobson

(10) Patent No.: US 8,014,943 B2
(45) Date of Patent: Sep. 6, 2011

(54) METHOD AND SYSTEM FOR DISPLAYING SOCIAL NETWORKING NAVIGATION INFORMATION

(76) Inventor: Gabriel Jakobson, Las Vegas, NV (US)

(*) Notice: Subject to any disclaimer, the term of this patent is extended or adjusted under 35 U.S.C. 154(b) by 269 days.

(21) Appl. No.: 12/291,802

(22) Filed: Nov. 13, 2008

(65) Prior Publication Data

US 2009/0281719 A1    Nov. 12, 2009

Related U.S. Application Data

(63) Continuation-in-part of application No. 12/151,827, filed on May 8, 2008.

(51) Int. Cl.
*G01C 21/00* (2006.01)
*G06F 17/30* (2006.01)

(52) U.S. Cl. ... 701/202; 701/208; 701/212; 340/995.21; 715/764

(58) Field of Classification Search ............ 701/202, 701/211, 208, 212, 213; 340/995.14, 995.21, 340/995.27; 715/785, 764
See application file for complete search history.

(56) References Cited

U.S. PATENT DOCUMENTS

| | | | | |
|---|---|---|---|---|
| 5,220,507 A * | 6/1993 | Kirson | | 701/202 |
| 6,199,012 B1 * | 3/2001 | Hasegawa | | 701/208 |
| 6,266,612 B1 | 7/2001 | Dussell | | |
| 6,415,224 B1 * | 7/2002 | Wako et al. | | 701/208 |
| 6,542,814 B2 * | 4/2003 | Polidi et al. | | 701/208 |
| 6,587,782 B1 | 7/2003 | Nocek | | |
| 6,954,697 B1 | 10/2005 | Smith | | |
| 7,054,743 B1 | 5/2006 | Smith | | |
| 7,324,896 B1 | 1/2008 | Smith | | |
| 7,359,798 B2 * | 4/2008 | Nagamasa | | 701/208 |
| 7,490,004 B2 * | 2/2009 | Kimura | | 701/201 |
| 7,698,062 B1 * | 4/2010 | McMullen et al. | | 701/211 |
| 2005/0085999 A1 * | 4/2005 | Onishi | | 701/211 |
| 2007/0050129 A1 * | 3/2007 | Salmre | | 701/207 |
| 2008/0228386 A1 * | 9/2008 | Geelen et al. | | 701/201 |

* cited by examiner

*Primary Examiner* — Tan Q Nguyen

(57) ABSTRACT

A mapping system associated with a social network includes determining that a social networking map object ("MO") is outside a visible area of a map displayed; calculating the direction, distance and travel-time to the MO (e.g. a social network member, a location, a meeting place, etc.), creating an object vector indicator ("OVI") and displaying the OVI on a map-display application. The OVI may be displayed on the periphery of the displayed map and may be positioned in the general direction of the MO. The position of the electronic device, as well as a current position of the MO, are factored into the calculations and placement of the OVI. The OVI may include a graphical representation, obtained from the social network, of the MO it references.

26 Claims, 21 Drawing Sheets

METHOD AND SYSTEM FOR DISPLAYING SOCIAL NETWORKING NAVIGATION INFORMATION

CROSS-REFERENCE TO RELATED APPLICATIONS

This application is a continuation-in-part of, and claims priority to, U.S. patent application Ser. No. 12/151,827 filed on May 8, 2008, titled "Method and System for Displaying Navigation Information on an Electronic Map". The disclosure of the prior application is considered part of and is incorporated by reference in the disclosure of this application.

FIELD OF INVENTION

The present invention relates generally to social networking and navigation. More particularly, the present invention relates to displaying information associated with social-networking map-objects (e.g. points-of-interest, way-points, social gathering places, member locations, etc.) that are outside the visible area of a map, within a map-display application.

BACKGROUND OF THE INVENTION

Popular social networking websites include Facebook™, MySpace™, LinkedIn™, Orkut™, Bebo™, Yahoo! 360™, Hi5™, Friendster, Cyworld™, Windows Live Spaces™, etc. A common facet of social networking is the ability to display objects of common interest on an electronic map. For example, locations of members and meeting places may be displayed on a map. Social-networking related objects, displayed on a map, may be demarcated by symbols indicating points-of-interest ("POI"), way-points ("WP"), business locations, places of interest, members' residences, members' meeting places, members' current locations, members' places of employment, etc. (collectively referred to inhere as map-objects, or ("MO")) For example, a user may perform a search for members' meeting places and the search results may be displayed as symbols on a map, corresponding to the geographic location of the meeting places in the result set of the search. In another common example, a user may request driving directions between social-networking related MOs, in response to which way-points may be displayed on the map, corresponding to geographic points along the plotted route of the driving direction.

Common mapping-related functionality includes "zoom in" and "zoom out", which allows the user to see a smaller region at a greater level of detail, and a larger region in less detail, respectively. At present, one or more MOs to be displayed on a map may be outside an area of the map visible to the user (e.g. when the user zooms into an area of the map not including the MO.) The user often may not be able to discern the direction and distance to the MO which is outside the visible area of the map, without (1) panning the map in the general direction of the MO until the visible area of the map includes the MO, and/or (2) zooming out until the visible area of the map includes the MO, and/or (3) in the case of a menu or a hyperlinked-list item referencing the MO, selecting the reference to the MO from the menu/the hyperlinked list item, in response to which the map automatically zooms/pans to include the MO.

SUMMARY OF THE INVENTION

The present invention provides various methods, systems and apparatus for displaying information related to social networking on an electronic map. Social-networking related information, collectively referred to inhere as MOs, which are outside a visible area of the map, may be referenced by displaying object vector indicators ("OVI".) The visible area of the map may be determined by a map-display application displaying the map. MOs which are outside the visible area of the map (e.g. in response to a user's zooming into an area of the map, or panning the map—resulting in the exclusion of an area of the map containing a MO; or MOs generated in response to a user's search query and/or WPs as part of driving directions, etc., which are outside the visible area of the map) may be referenced by displaying OVIs.

An OVI may be displayed by the map-display application in conjunction with the area of the map displayed by the map-display application. In one embodiment, the OVI may be displayed at the periphery of the area of the map. The OVI may include information referencing the MO, as well as information on the MO's direction, distance, travel-time to the MO, estimated-time-of-arrival, etc. In various embodiments the MO's direction, distance, travel time, etc., may be calculated from the current geographic position of the user (e.g. determined via GPS); or alternatively, from an MO on the area of the map visible to the user, that is closest to the center of the visible area of the map; or from the MO selected by the user, etc. The OVI's position may change or be changed to correlate with the respective positions of the user and the MO referenced by the OVI. Information included in the OVI may change to correlate with the respective positions of the user and the MO the OVI references. An OVI may include symbols indicating the type of MO referenced, and may change in appearance, including a change in the information the OVI displays, in response to various factors such as a change in the coordinates of the user using the map-display application.

DESCRIPTION OF THE DRAWINGS

For a more complete understanding of the present invention and further advantages thereof, references are now made to the following Detailed Description, taken in conjunction with the drawings, in which.

DETAILED DESCRIPTION

Figure 1:
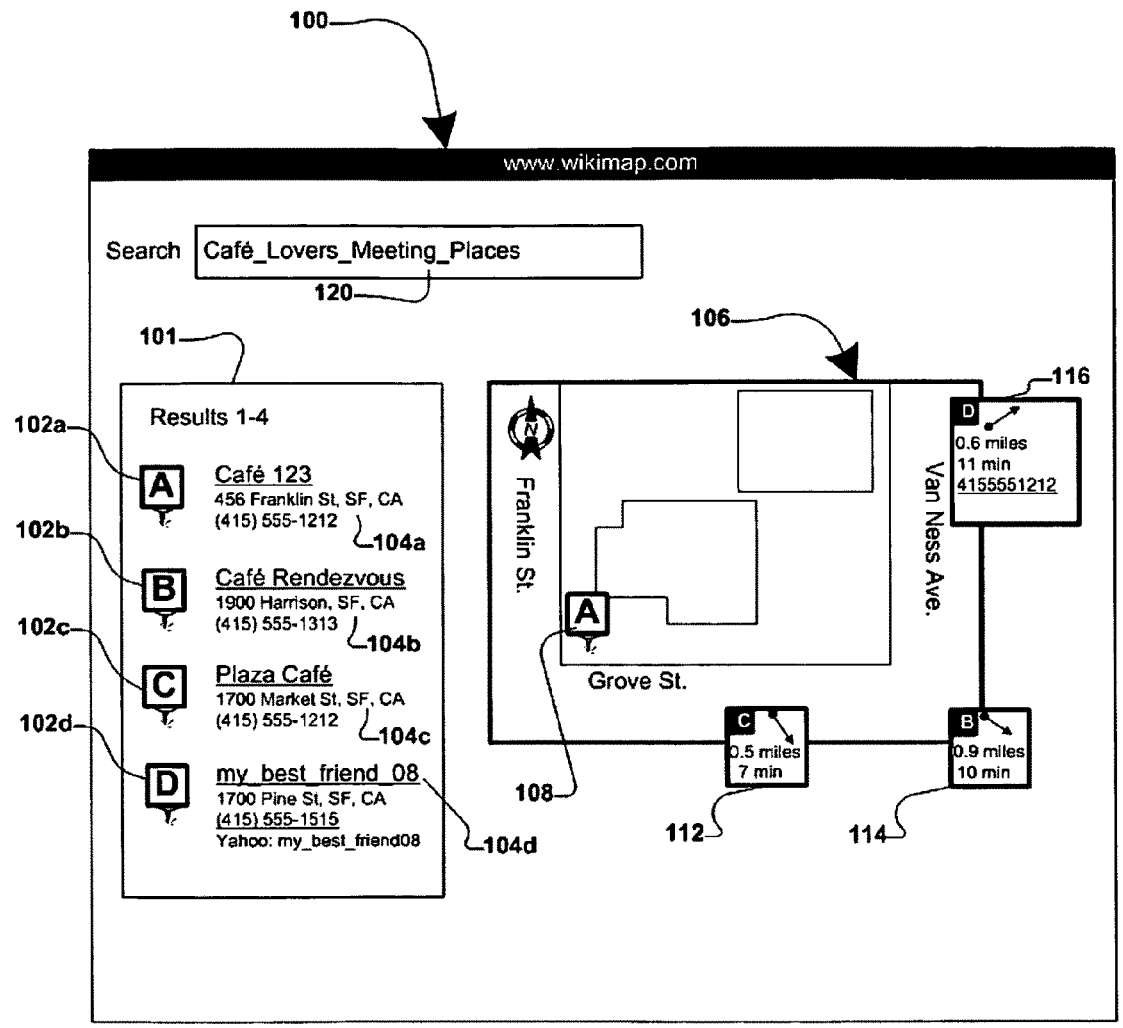
FIG. 1 is a generalized block diagram illustrating displaying object vector indicators ("OVI") associated with a map which is displaying social networking information, according to one embodiment of the present invention.

FIG. 1 is a generalized block diagram illustrating displaying object vector indicators ("OVI") associated with a map which is displaying social networking information, according to one embodiment of the present invention. A map display application 100 (e.g. an internet browser), on a computing device (e.g. a personal computer, a personal digital assistant, a cellular phone, etc.) may display a visible area of a map 106. The visible area of a map 106 may represent a small portion of a much larger virtual map—while the larger virtual map (e.g. the entire globe, continent, state, city, etc.) may be outside the display area and not visible to the user, the portion comprising the visible area of a map 106, may be visible to the user. The visible area of a map 106 may include location markers denoting social networking points-of-interest ("POI") visible to the user. The map-display application 100 may also include references to location markers outside a visible area of a map 106.

For example, the user may search a social network with a query "Cafe-Lovers-Meeting-Places" 120. In response to the user query 120, the visible area of a map 106 may be rendered and a resulting list of locations 101 may be displayed In the prior art, the resulting list of locations 101 may include location marker identifiers 102a-102d, corresponding to the location markers' names and descriptions 104a-104d, respectively. The user may select a location marker identifier "A" 102a in response to which the visible area of a map 106 may re-render and/or zoom and/or pan in a manner allowing the corresponding location marker "A" 108 to be visible on the visible area of a map 106. The location marker "A" 108 on the visible area of a map 106 may correspond to the geographic location of the address of "Café 123" which is "456 Franklin St. San Francisco, Calif." 104a. In prior art, location markers corresponding to locations 104b-104d, whose geographic coordinates are outside of the visible area of a map 106, are not displayed. Thus, the user may be unaware of the relative locations and distances of the location markers not visible on the visible area of a map 106.

In the presently-preferred embodiment of this invention, location markers outside the visible area of a map 106 may be referenced by OVIs, displayed to the user by the map-display application 100. The location marker identifiers "B" 102b, "C" 102c and "D" 102d, in the list of locations 101, may be referenced by the OVIs "B" 114, "C" 112 and "D" 116, respectively.

For example, the OVI "D" 116 may reference a remote location marker, not visible on the visible area of a map 106, corresponding to the geographic location of the location marker identifier "D" 102d, at location/address/information "1700 Pine St., SF, CA, (415) 555-151, Yahoo: my_best_friend08" 104d. (A social network may provide member information including name, address, phone number, instant-messenger Id, etc.) Information displayed in the OVI "D" 116 may include a vector (e.g. arrow) pointing in the direction of the referenced remote location marker, the distance and travel time to the remote location marker and any other information associated with the location marker identifier (e.g. member's name, phone number, etc.) Similarly, the other OVIs "B" 114 and "C" 112 may point to their corresponding remote (i.e. not visible to the user on the visible are of a map 106) location markers and may contain information about respective distances and travel times.

Figure 3A:
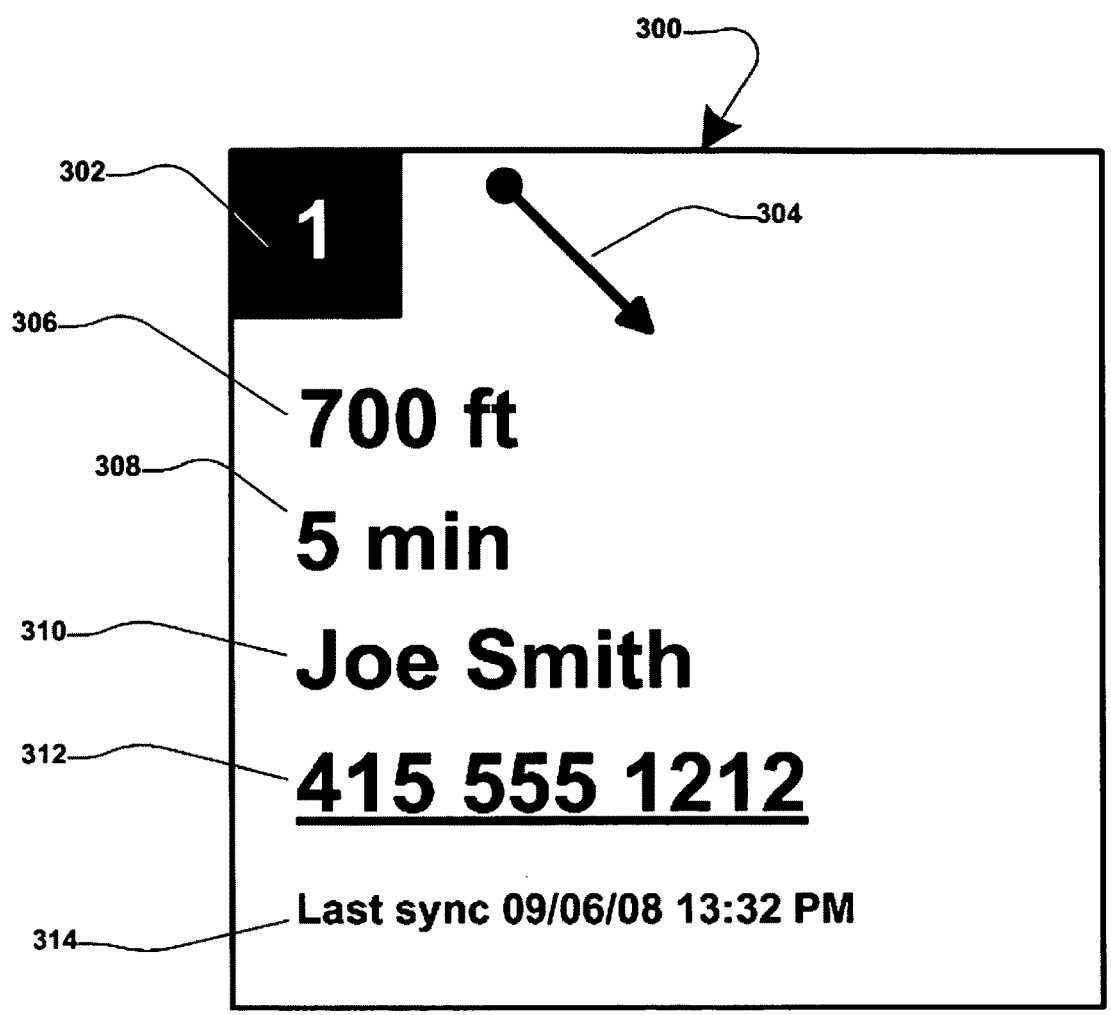
FIGS. 3A, 3B and 3C are a generalized block diagrams illustrating the appearance and positioning of object vector indicators ("OVI"), according to various embodiments of the present invention.
Figure 3B:
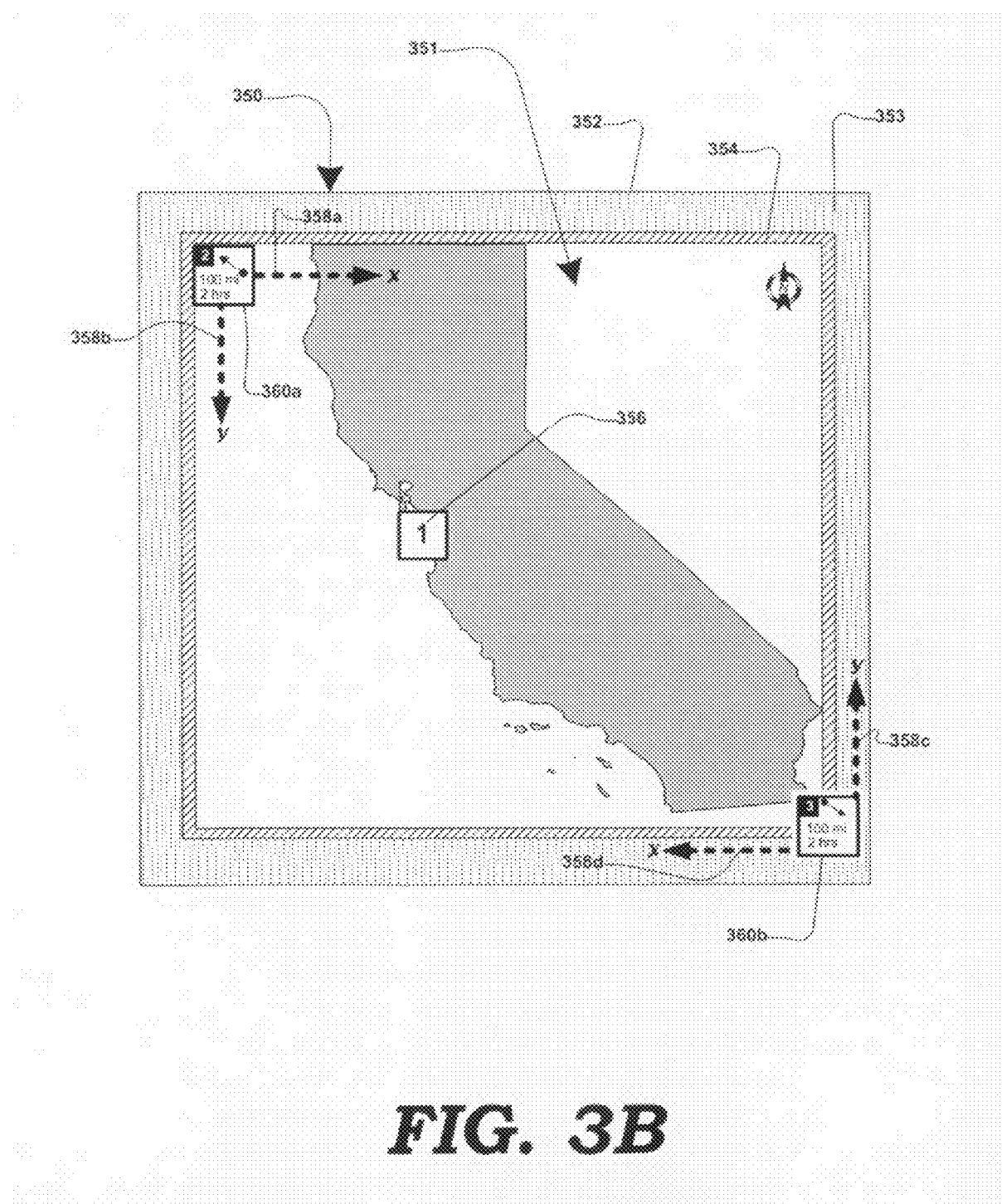
Figure 3C:
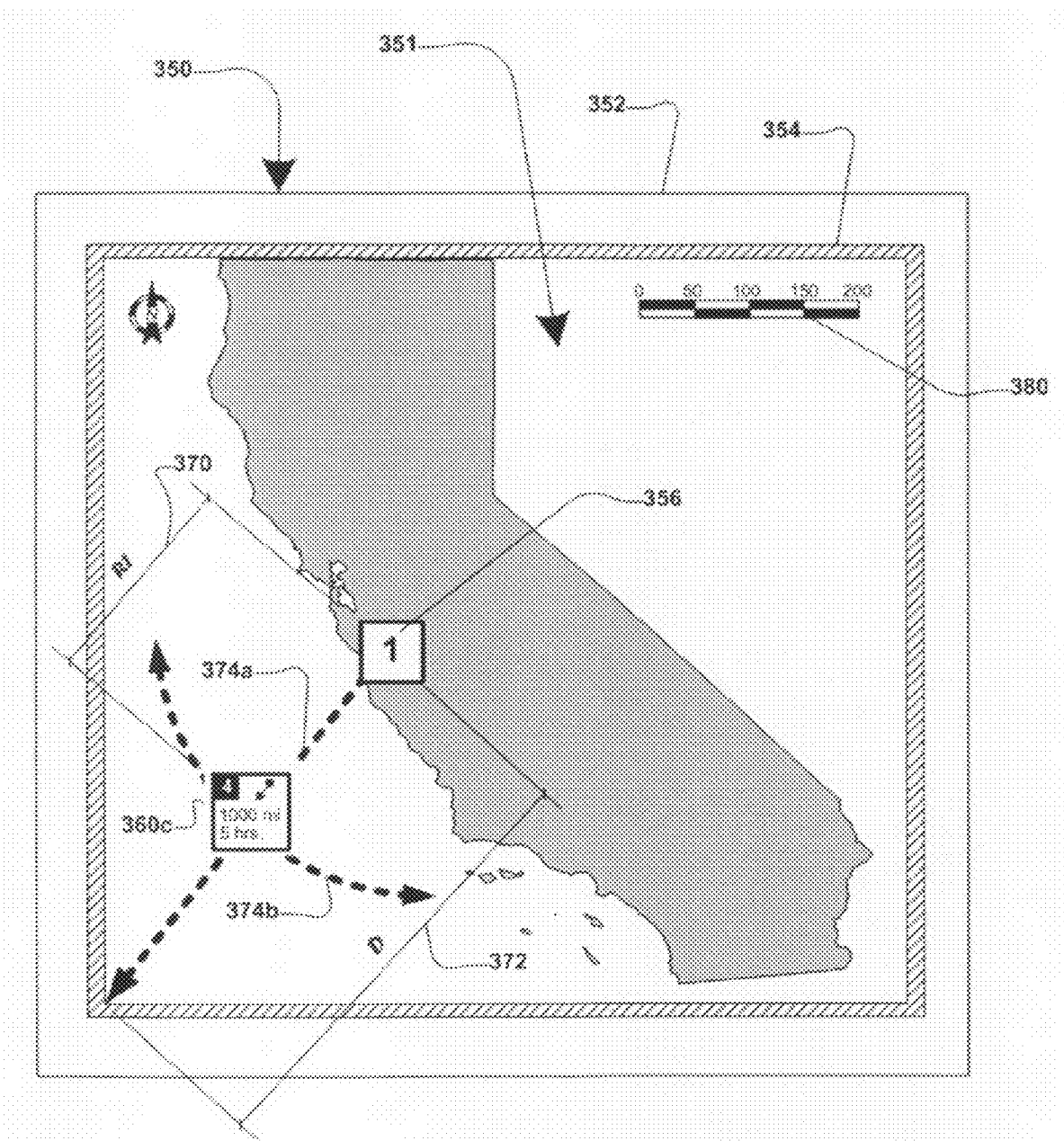

Please refer to FIGS. 3A-3C for more in-depth discussion of OVIs, the data they may contain and their placement on the visual display. FIGS. 6A and 6B, 8A-8C and 9A-9E describe various embodiments involving OVIs and their use in electronic maps.

Figure 2A:
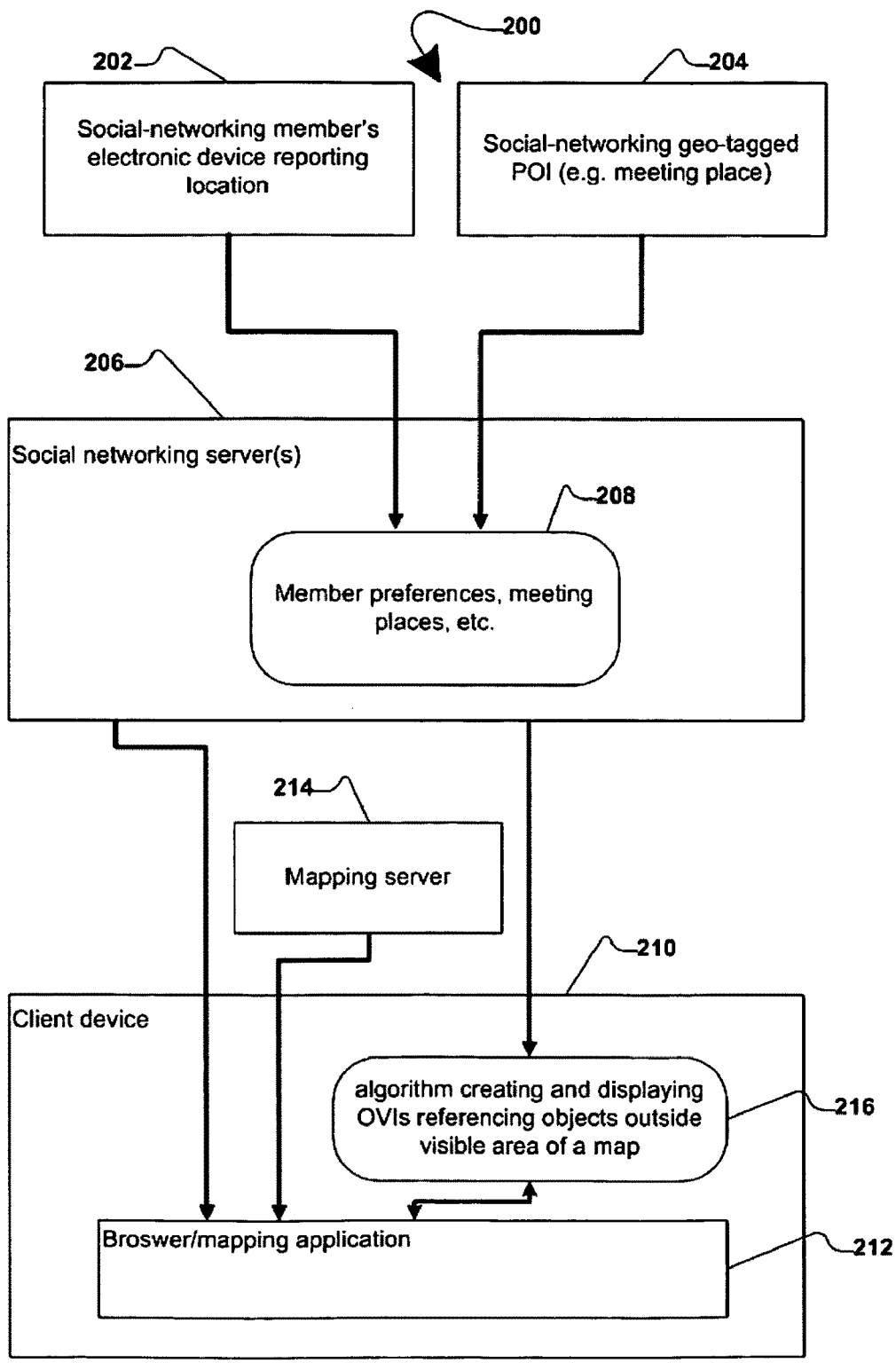
FIGS. 2A and 2B are generalized block diagrams illustrating the creation of OVIs associated with a social network, displaying information on a map on a client device, according to various embodiments of the present invention.
Figure 2B:
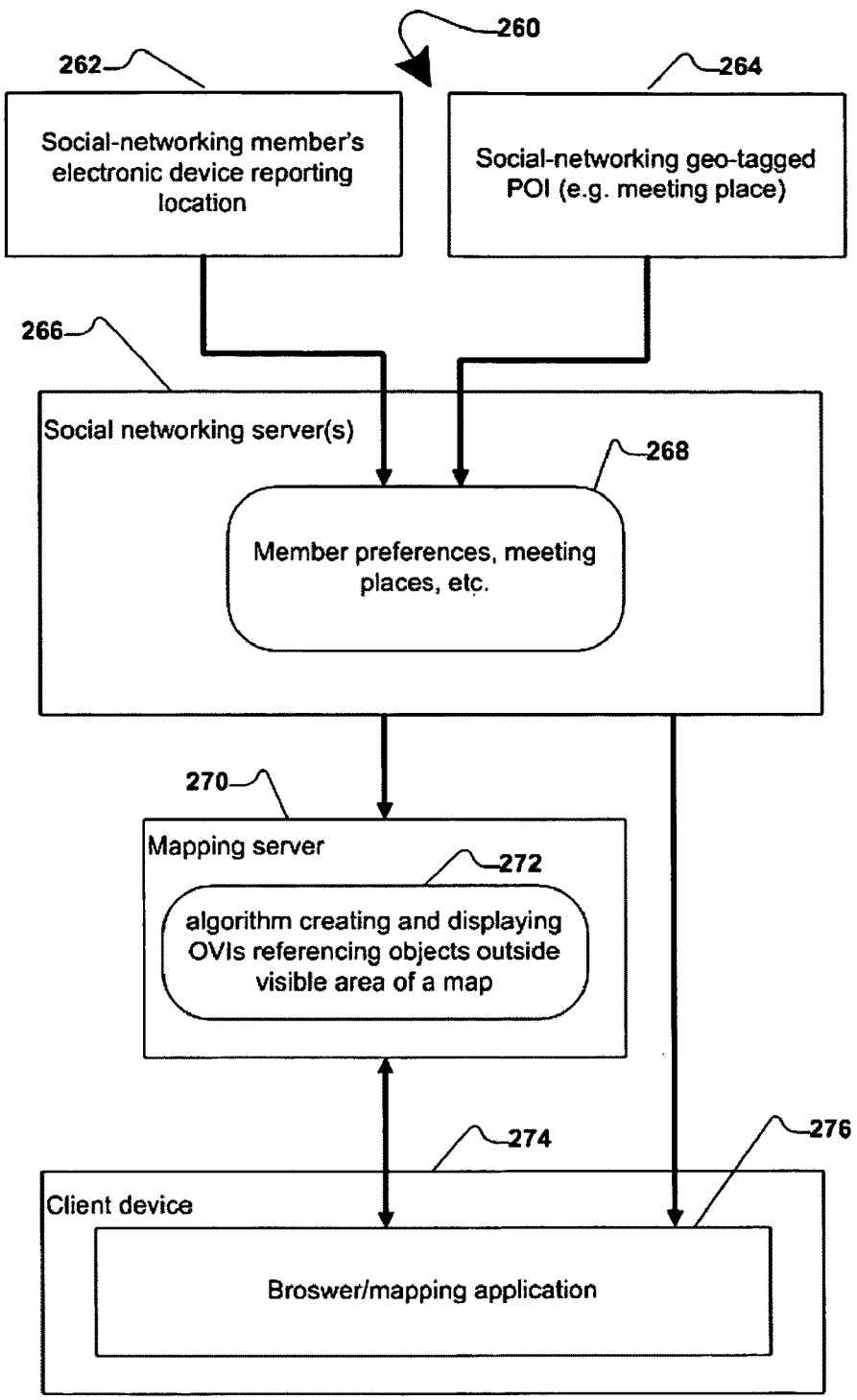

FIGS. 2A and 2B are generalized block diagrams illustrating the creation of OVIs associated with a social network, displaying information on a map on a client device, according to various embodiments of the present invention.

Referring to FIG. 2A, block diagram 200 illustrates a system displaying social-networking information on a map on a client device, as commonly implemented in the prior art. A social networking service 206 (comprising one or more servers), may include a data store 208, storing member profiles, locations, preferences, meeting places information, POIs, etc.

An electronic device 202, used by a member of a social network, may transmit its geographic location to the social network service 206 for recording in the data store 208. For example, the electronic device may be equipped with GPS (or other means of discerning geographic location such as using cellular phone tower triangulation) and periodically transmit its location to the social networking service 206.

The social network data store 208 may aggregate information referencing POIs: meeting places, restaurants, events, stores, etc. A POI 204 may transmit its geographic location to the social network data store 208; or, in other implementations, a web crawler may be used by the social network to seek and aggregate geographic locations, or members of the social network may submit geo-tagged location information to the social network 206, etc.

A client device 210 (e.g. personal computer, mobile device, etc.) may receive information from the social network 206 and display the information in a mapping application 212. The mapping application 212 may be a web browsing application or any other application capable of displaying an electronic map containing geographic data, obtained from the social network 206. A mapping server 214 (commonly on a network, such as the internet, external to the client device 210; but, may also be internal to the client device such as mapping software coupled with DVD ROM) may be used to generate mapping data on the mapping application 212.

In one presently-preferred embodiment, an OVI algorithm 216 may be executed on the client device 210. The OVI algorithm 216 may be contained in an application, an application module, an object, a DLL, an ActiveX control accessible to the mapping/web-browser application 212, or in any other computer code executable by a processor on the client device 210.

The OVI algorithm 216 may receive mapping data from the social network 206, from the mapping application 212 and from the mapping server 214. The OVI algorithm 216 may determine both bounds of a map displayed in the mapping application 212 and the mapping data outside of the determined bounds. The OVI algorithm 216 may create OVIs referencing the mapping data outside of the determined bounds. The OVIs may be displayed by the map display application 212.

Referring now to FIG. 2B, in an alternate embodiment illustrated in diagram 260, a mapping server 270 may include an OVI algorithm 272. A record store 268 of a social networking service 266 may aggregate social-networking related data from external sources (e.g. social network members 262, POIs related to social networking 264, etc.)

A mapping application 276 (e.g. a web browser, a mobile-device mapping application, etc.) on a client device 274 may display social networking mapping data from the social network 266. A mapping server 270, external to the client device 270, may process mapping data related to the social network 266. The mapping server 270 may generate a map, or map-related graphics (e.g. mapping tiles, graphical representations of POI displayed on a map, etc.) which is displayed by the mapping application 276 on the client device 274.

The mapping server 270 may include OVI display algorithm 272. The OVI algorithm 272 may receive mapping data and determine bounds of a map displayed in the mapping application 276. The OVI display algorithm 272 may determine the mapping data outside of the determined bounds. The OVI algorithm 272 may create OVIs referencing the mapping data outside of the determined bounds. The OVIs may be displayed by the map display application 276.

In alternate embodiments of the present invention, individual algorithms determining social-networking related mapping data outside a visible are of a map, creating OVI and displaying the OVIs, may be implemented in different places (i.e. be part of different hardware and or software components represented in the diagrams 200 and 260.) I another embodiment, one ore more OVI algorithms may be implemented as code in a mapping application, a map-generating application, a social-networking related application, etc.

FIGS. 3A, 3B and 3C are a generalized block diagrams illustrating the appearance and positioning of object vector indicators ("OVI"), according to various embodiments of the present invention. An OVI 300 may be rendered in the form of any geometric shape, e.g. a rectangle, and appear in any color, e.g. where the color and/or the color's intensity bears a meaning, such as distance or travel time. Information associated with the OVI 300 (e.g. a vector 304, an object reference 302, a distance indicator 306, a travel-time indicator 308, etc.) may be displayed internally or externally to the OVI 300. In alter embodiments, the OVI 300 may be an image, an animation of images, or any other graphic.

The manner in which the OVI 300 is displayed, its positioning and information it contains, may be set by user preferences or defaults. The position of the OVI 300 may vary and may shift in response to various factors, such as changing road conditions, the movement of the user of the electronic map, etc.

The object reference 302 (e.g. "1") may be an alpha-numeric character and/or a symbol identifying the MO referenced by the OVI 300. In an alternate embodiment, a single OVI may cycles through referencing more than one MO, with the object reference 302 indicating the proper MO throughout the cycle.

The vector 304 may point in the direction of the MO referenced by the OVI 300. The base of the vector 304 may be oriented with an MO visible to the user. The shape of the vector 304 may be a line with an arrowhead at the end. The orientation of the vector 304 may change in response to the motion of the user. For example, as the user travels North with respect to the MO that is due East, the orientation of the vector 304 may change such that it rotates clock-wise and keeps pointing at the MO.

In alternate embodiments, physical characterizes of the vector 304, such as length, thickness, color, etc. may correspond to attributes related to the MO referenced by the OVI 300. For example, traveling in the direction of the MO referenced by the OVI may cause the vector 304 to change shape, color, blink, etc.

The distance indicator 306 may represent the distance needed to travel to reach the referenced MO. The travel distance may be expressed in any unit of measurement, such as English, Metric, etc, and may be based on user preferences, locale settings, distance thresholds (e.g. any distance less than ½ a mile may be expressed in feet), etc. Various methods and algorithms may be used to determine the distance needed to travel (e.g. based on road conditions, method of travel, traffic, etc.) In various embodiments the distance indicator 306 may be in different colors or display modes to indicate various states. For example, for a mobile user traveling along a path between MOs, deviating from an ideal route may cause the color of the distance indicator 306 to change, flash, etc.

The travel-time indicator 308 may represent the time needed to travel to reach the referenced MO. The travel time may be expressed in various ways, for example based on user preferences, locale settings, time thresholds (e.g. travel time less than ½ a hour may be expressed in minutes), etc. Various methods and algorithms may be used to determine the time needed to travel (e.g. based on one way roads, road conditions, method of travel, traffic, speed of travel, etc.) In various embodiments the travel-time indicator 308 may be in different colors or display modes to indicate various states. For example, for a mobile user traveling along a path between MOs, deviating from an ideal route may cause the color of the travel-time indicator 308 to change, flash, etc.

MO name 310 may identify the name/handle of the social-network member (e.g. "Joe Smith")/POI represented by the MO. The MO name 310 may be obtained from a social network. The MO name 310 may be displayed in the OVI 300, depending on the size constraints, user preferences and other limitations and considerations. In one possible embodiments, the MO name 310 may be selectable by the user and in response to the user selection (e.g. via a pointing device, a touch screen, a voice commands, etc.) additional information related to the MO name 310 may be displayed.

Contact information 312 may enable a user to reach (i.e. electronically transmit information to) the MO referenced by the OVI 300. For example, the contact information 312 may be a phone number (e.g. "415 555 1212"). In one possible embodiment, the contact information 312 may be selectable by the user and in response to the user selection (e.g. via a pointing device, a touch screen, a voice commands, etc.) an electronic communication may be established with the referenced MO (e.g. via a phone call, SMS, email, instant message, etc.)

In cases where the position of the MO and/or the position of the client device displaying the MO 300, changes, a synchronization date/time stamp 314 may be displayed. For example, if the MO represents a social network member using an electronic device enabled to determine and transmit its location, the last transmission time of the location of the remote member's electronic device may be displayed (e.g. "Last sync Sep. 6, 08 13:32 PM".)

In other possible embodiments, other information may be displayed on the OVI 300. Information displayed on the OVI 300 may be displayed in varying colors, font sizes and as various different graphical representations.

Referring now to FIG. 3B, a map-display application 350 may display a map 351. The map display application 350 may have two borders: the physical border of the display 352 (e.g. the edges of the LCD display beyond which no data can be displayed) and a displayed border 354, confining the map 351. A region 353 between the display-border 354 and the physical border 352, may be used to display additional information. In another embodiment, the display-border 354 may not exist, or may overlap the physical border 352.

A location marker 356 may be displayed on the map 351. Other location markers may exist outside the visible area of the map 351. For example, a location marker "2" (not shown) may exist north-west of the location marker "1" 356 on the map 351, outside the visible area of the map 351. In one possible embodiment, an OVI 360a may reference the location marker "2", positioned externally to the visible map 351. The OVI 360a may be displayed on the map 351, and may be bound by the display-border 354. According to this one possible embodiment, the OVI 360a may be positioned in close proximity to—or touching—the display-border 354.

In this one presently-preferred embodiment, the position of the OVI 360a may change along the "x" axis 358a and "y" axis 358b. For example, when the map 351 is displayed while "in motion" (i.e. the user of the electronic device displaying the map 351 is moving and/or the referenced location marker "2" is in motion) the OVI 360a may be repositioned along the "x" axis 358a, in response to a relative East-West movement; and along the "y" axis 358b in response to a relative North-South movement—within the confines of display-border 354.

In an alternate preferred embodiment, an OVI 360b may be displayed on top of the display-border 354 (e.g. the display-border 354 may bisect the OVI 360b.). A portion of the OVI 360b may be displayed on top of the map 351, another portion may be displayed on top of the display-border 354 and another portion may be displayed over the region 353. In response to a relative change in the position of the referenced MO (e.g. a location marker "3"—not shown—referenced by the OVI 360b) the OVI 360b may move East-West, along the "x" axis 358d, and/or North-South, along the "y" axis 358c.

Referring now to FIG. 3C, in another alternate embodiment, an OVI 360c (e.g. referencing a MO "4"—not shown—external to the map 351, South-West of the location marker 356) may be displayed on the map 351. The OVI 360c may be positioned along an imaginary line 374a, spanned between the location marker "1" 356 and the MO "4" (not shown).

In one possible embodiment, the positioning of the OVI 360c along the length "D" 372 of the imaginary line 374a may be proportionate to the real-life distance between the geographic location denoted by the location marker "1" 356 and the MO denoted by the location marker "4" (not shown.), on a different scale from the scale of the map 351. The length "D" of the imaginary line 374a may be defined as the distance between the location marker "1" 356 and the intersection point of the imaginary line 374a with the display-frame 354.

For example, the map 351 may be displayed on a scale where 1 inch=100 miles (as indicated by a scale 380.) The distance from the location marker "1" 356 to the referenced MO "4" may be 1,000 miles in this example (as indicated by the distance measurement in the OVI 360c.) The distance "D" 372—being the length of the imaginary line 374a—may represent a larger scale, for example, 1 inch=600 miles. Thus the distance "D" 372 of the imaginary line 374a may represent about 2,000 miles (approximately 3 inches on the map 351.) In this example, the positioning of the OVI 360c approximately at the half-way point of the imaginary line 374a, may serve as a visual indicator to the user that the invisible referenced MO "4" may be approximately 1,000 miles away. The repositioning of the OVI 360c along the imaginary line 374a, North-West in the direction of the location marker "1" 356, may serve as a visual indicator to the user that the invisible referenced MO "4" is getting closer to the location marker "1" 356 and thereby closer to the user and closer to being visible on the map 351.

An imaginary arched path 374b, at a radius "R1" 370 from the location marker "1" 356, may be followed by the OVI 360c as the invisible referenced MO "4" moves around the location marker "1" 356. For example, if the user standing at a geographic location represented by the location marker "1" 356 makes a complete 360 degree turn clockwise, the OVI 360c may sweep along the arc 374b in a counter-clockwise direction, maintaining the radius "R1" 370 as the distance. R1 may increase or decrease in relation to the change in the distance between the location marker "1" 356 and the invisible referenced MO "4", as discussed in the previous paragraph.

In alternate embodiments, various other methods and visual representations may be used to reference MOs external to the map 351, without departing from the scope and spirit of the present invention.

Figure 4A:
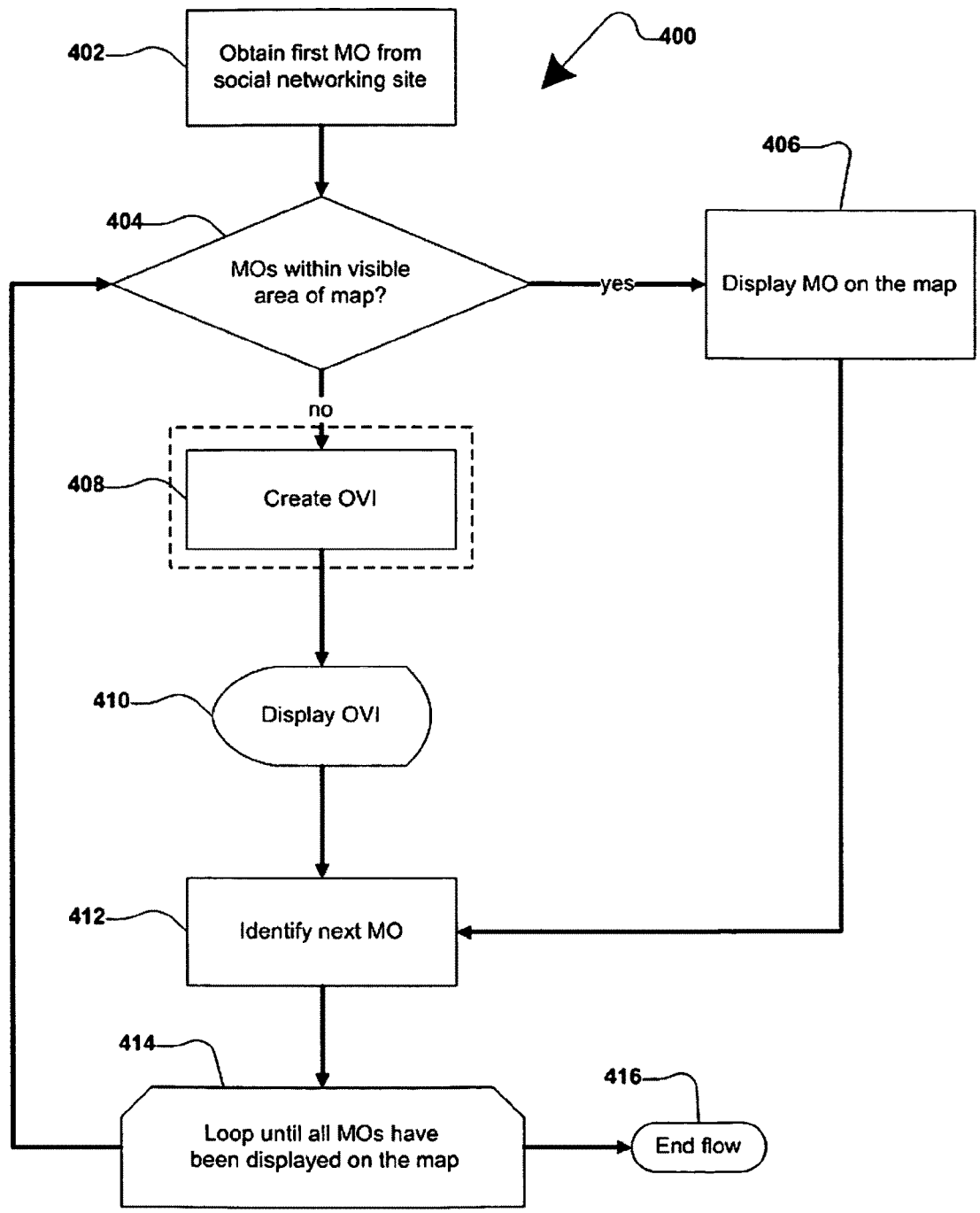
FIGS. 4A and 4B are generalized flow diagrams illustrating the creation and displaying of OVIs from data in a social network, according to various embodiments of the present invention.
Figure 4B:
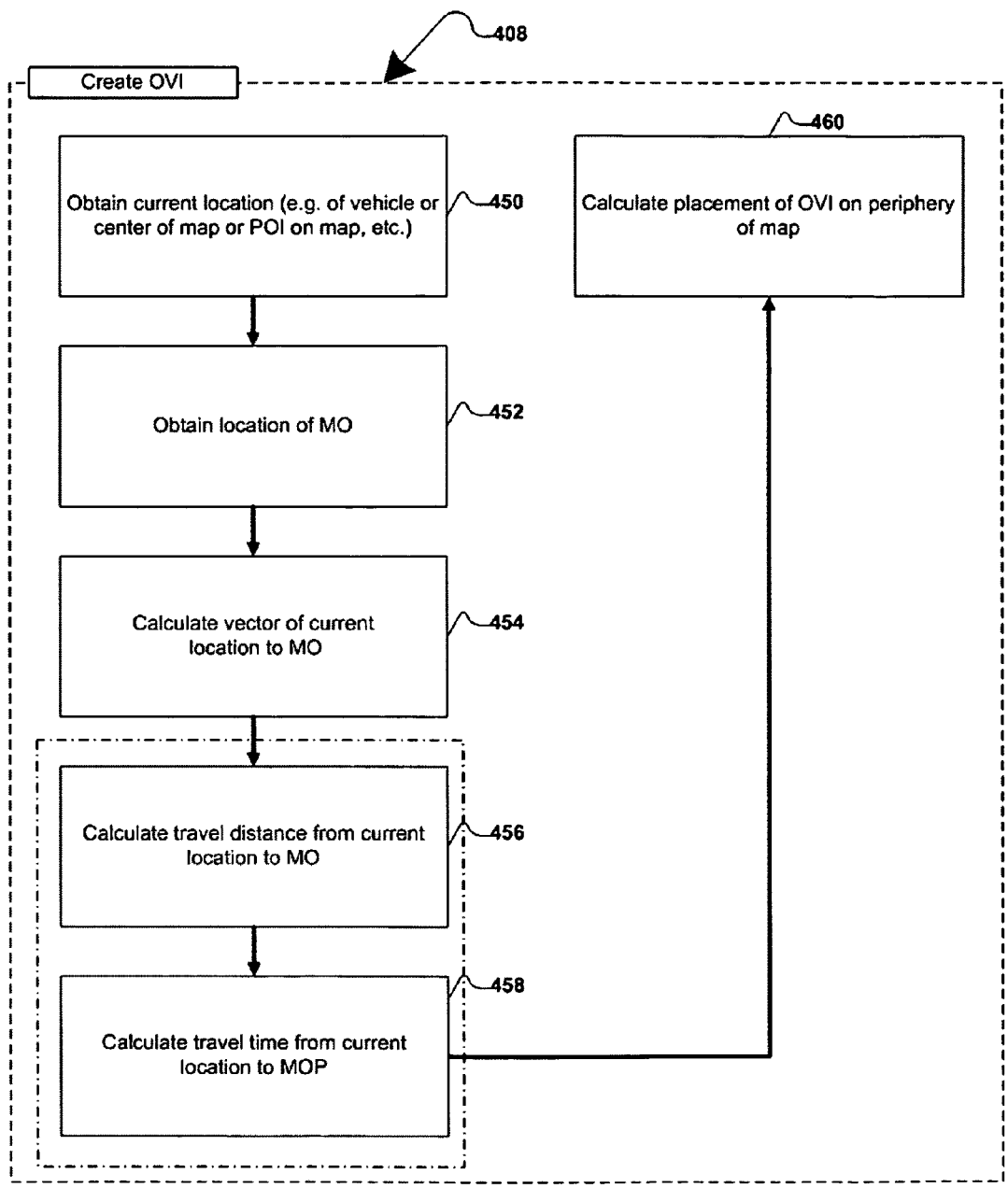

FIGS. 4A and 4B are generalized flow diagrams illustrating the creation and displaying of OVIs from data in a social network, according to various embodiments of the present invention. A map-display application, running on a digital device may be connected to a mapping server. For example, an internet browser on a personal computer/laptop/tablet PC, etc., connected to a mapping service such as Google® Maps, Yahoo!® Maps, Windows® Live Search Maps etc.; a GPS navigation unit such as Garmin®, Magellan®, TomTom® etc. connected to a local mapping server/database such as a mapping DVD or to a remote mapping server and displaying a map through a proprietary map-display application; a cellular/smart phone displaying mapping data through an internet browsing application or a mapping application, etc.

Flowchart 400 illustrates a methodology for displaying OVIs by a map-display application. Upon a triggered event in the map-display application (e.g. in response to a change in zoom/pan, change in data causing a "redraw" or "refresh" command to execute by the map-display application or in response to user input, a programmable "event", new data from the social network such as a remote user's device reporting a new location, etc.) a map is displayed and OVIs are created to reference MOs outside the visible area of the map. In the flow 400 all MOs to be displayed on a map (e.g. MOs obtained from a social network) may be traversed and every MO may either be displayed as a location maker—if its location is in the visible area of the map—or as an OVI—if its location is not in the visible area of the map.

At step 402, a first MO may be identified. MOs may be data points in a social network designed to be displayed on a map. For example, street locations of meeting places, current locations of mobile social-network members, etc. The first MO might be the first of any number of MOs demarcated on a map via location markers.

At step 404, it may be determined whether the MO is within the visible area of a map. The determination may be made by calculating the geographic bounds of the region of the map displayed by the map-display application, and determining whether the geographic (e.g. longitude/latitude) coordinates of the MO are within the bounds of the visible area of the map (please note that this type of determination is well established in prior art, as map-display applications determine what geographic locations are to be displayed.)

If it is determined at step 404 that the MO is within the bounds of the visible area of the map, at step 406 the MO may be displayed on the visible area of the map of the map-display application. At step 412, the next MO is identified and at step 414 the process is repeated until all MOs have been displayed on the map. Steps 404, 406, 412 and 414 may be repeated until all MOs have been traversed.

If it is determined at step 404 that the MO is not within the bounds of the visible area of the map, at step 408 an OVI may be created to reference the MO. (Please refer to FIG. 4B illustrating the creation of an OVI.)

At step 410, the OVI created at step 408 may be displayed. The OVI may be displayed in numerous ways. Please refer to the discussion of FIGS. 3A-3C for OVI display embodiments.

At step 412, the next MO may be identified. Step 412 may also be executed following step 406.

If at step 412 another valid MO is identified, step 414 may revert to step 404, examining the new MO identified at step 412. If at step 414 it is determined no valid MO has been identified at step 412 (i.e. all MOs have been traversed) at step 416 the logic of the flow 400 may end.

Please note that in one embodiment, steps 404, 406, 412 and 414 may be implemented, while in other embodiments the additional steps 408 and 410 may be implemented.

Referring now to FIG. 4B, steps 450-460 are an illustration of smaller steps comprising the "create OVI" step 408 in FIG. 4A.

At step 450, the current location of the electronic device displaying the map-displayed application, may be obtained (e.g. via the use of GPS navigation, cellular phone triangulation, etc.) In an alternate embodiment, the geographic location of a MO on the map (e.g. the MO at the center of the map) may be considered to be the current location.

At step 452, the location of the MO (identified at step 412 and determined to not be within the visible area of the map of the map-display application at step 404 of FIG. 4A), may be determined.

At step 454, a vector from the current location determined at step 450 to the location of the MO determined at step 452, may be computed. The vector (e.g. an arrow) may represent the direction and distance between the current location and the location of the MO.

At step 456, the travel distance between the current location determined at step 450 and the location of the MO determined at step 452, may be computed. The algorithm for computing the travel distance may be based on the medium of travel (i.e. by foot, car, etc.), the optimal choosing of roads, user preferences, etc.

At step 458, the travel time between the current location determined at step 450 and the location of the MO determined at step 452, may be computed. The algorithm for computing the travel time may be based on the medium of travel, the optimal choosing of roads, user preferences, traffic and weather conditions, etc.

At step 460, the placement of the OVI on the map-display application may be determined. Please refer to FIGS. 3A-3C for a more complete discussion of various embodiments for placing an OVI in a map-display application.

Figure 5A:
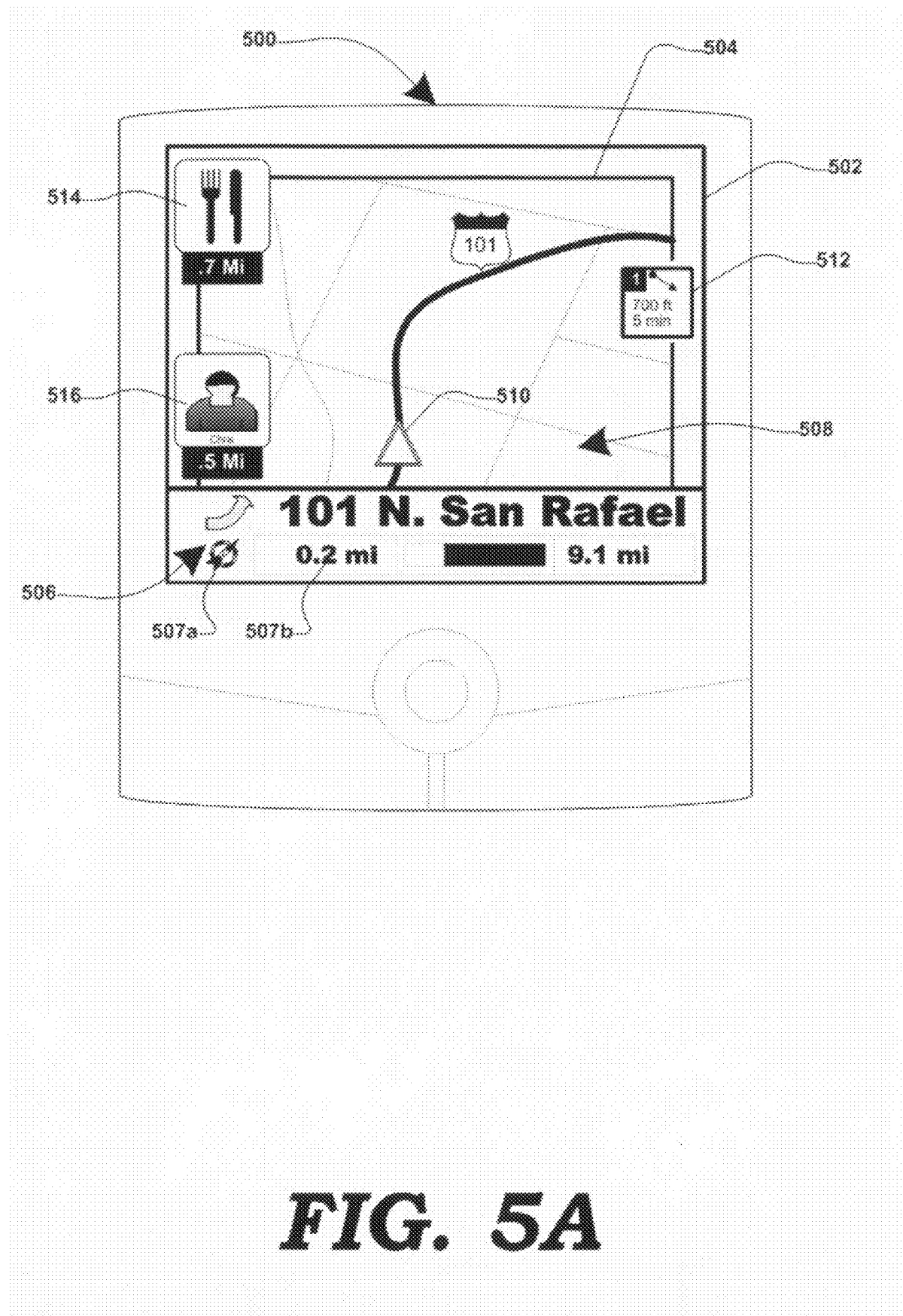
FIGS. 5A and 5B are generalized block diagrams illustrating displaying object vector indicators ("OVI") in GPS navigation devices, according to one embodiment of the present invention.
Figure 5B:
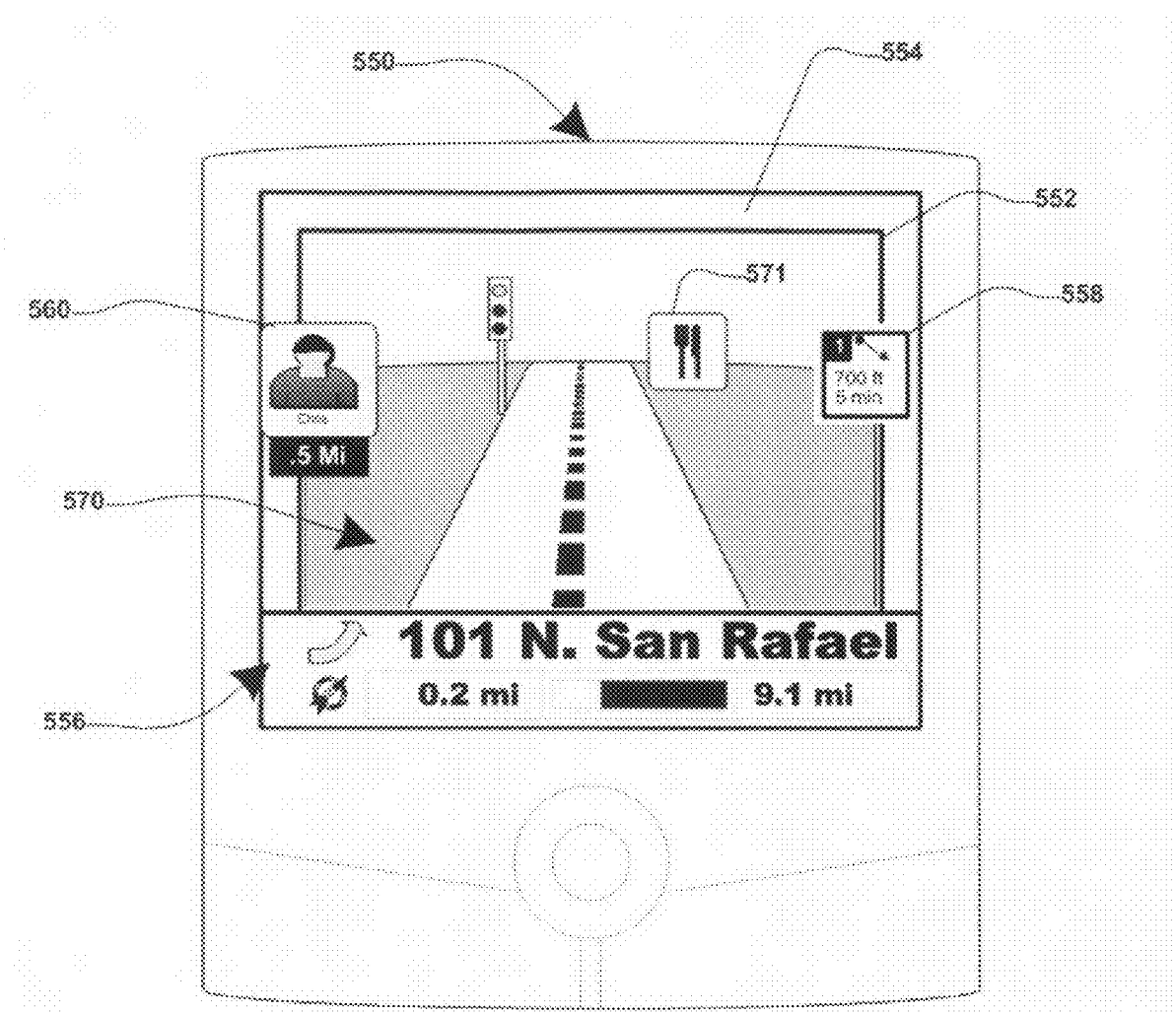

FIGS. 5A and 5B are generalized block diagrams illustrating displaying object vector indicators ("OVI") in GPS navigation devices, according to one embodiment of the present invention. GPS navigation devices (e.g. used in car navigation) may display way-points ("WP") or points-of-interest ("POI") collectively referred to inhere as map-objects ("MO"). In association with social networking, GPS navigation devices may display MOs denoting the locations of places of interest, present locations of mobile members, etc.

In the prior art, only MOs within the bounds of a visible portion of a map are displayed. MOs outside the bounds of the visible portion of the map are not displayed. A MO that is the next way-point or destination in travel directions, may be referenced. For example, referring to FIG. 5A, a GPS navigation device 500 may display a visible area of a map 508 in a map-display application 506. A direction-indicator 507A and a distance indicator 507b may reference the next MO along a travel route. However, no other MOs are referenced, in the prior art.

In one preferred embodiment of this invention, OVIs 512, 514 and 516 may be displayed by the map-display application 506, referencing MOs which are outside the area of the map 508 visible to the user through the map-display application 506. The OVI 512 may display information referencing a MO "1" outside the visible area of the map 508. The OVI 512 may indicate the direction of the MO it references (e.g. via an arrow), the distance to the MO (e.g. "700 ft") and the travel time to the MO (e.g. "5 min.")

An OVI may display a symbol indicating the nature of the MO it references, along with other relevant information, such as the distance, etc. For example, the OVI 514 may include a prominent symbol related to eating—such as a knife and fork—which may indicate and social network gathering place/restaurant. The OVI 516 may display a prominent symbol of a person, indicating a location/position of a social network member. In various possible embodiments, the symbol of the person may be an icon, an image of the social network member, etc.

The distance indicators in the OVIs 512, 514 and 516 may be measured from the current location of the vehicle/user, commonly indicated by a symbol 510 on the map 508. In response to a change in the location of the vehicle/user, the positioning of the OVIs 512, 514 and 516, and information the OVIs contain (e.g. distance), may change. The OVIs 512, 514 and 516 may be displayed on the periphery of the map-display application 506. In one embodiment, the map-display application 506 may contain a physical border 502 (i.e. the physical edge of the display) and a display-border 504 (i.e. the edges of the visible area of the map 508.) The OVIs 512, 514 and 516 may be displayed overlaying the display-border 504 (i.e. extending farther towards the physical border 502 than the visible area of the map 508, which may be confined to within the border 504.) In alternate embodiments, the OVIs may be displayed in various other ways, as illustrated and discussed in FIGS. 3A-3C.

Referring now to FIG. 5B, a GPS navigation device 550 may display a graphic 570, which may correlate to a physical map, from the perspective of a driver. In prior art, a MO 571 (e.g. a location marker with a symbol for a restaurant) may be displayed by the graphic 570, representing the approximate location of the MO, from the perspective of the viewer (i.e. the driver.) The MO 570 must be within the field-of-view of the user (i.e. driver) albeit at a certain distance (i.e. down-the-road.)

In the present embodiment, OVIs 558 and 560 may be displayed by a map-display application 556, to indicate MOs not visible on the graphic 570 (i.e outside the field-of-view of the user/driver.). The placement of OVIs may be computed such that, from the perspective of the user/viewer/driver, the top of the display frame 552 may be considered "in front"; the left and right sides of the display frame 552 may be considered "left of" and "right of", respectively; and the bottom of the display frame 552 may be considered "behind".

As a vehicle that mat be associated with the GPS navigation device 550, in this example, moves and its own position is recomputed, the OVIs 558 and 560 may be repositioned accordingly. In this example, the OVI "1" 558, positioned along the right side of the display border 552, may indicate its referenced MO is to the right of the vehicle (i.e. of the GPS navigation device 550), outside the user/viewer/driver's field-of-view. Information associated with the OVI 558 (e.g. direction, distance, time-of-arrival, etc.) may be displayed inside of—or in close proximity to—the OVI 558. Similarly, the OVI "2" 560, positioned left-of-center along the top of the display border 552, may indicate the MO (e.g. a social network member "Chris") the OVI "2" 560 references is to-the-left of the vehicle (i.e. of the GPS navigation device 550).

In alternate embodiments other methods of displaying OVIs in GPS navigation units may be employed. OVIs may bear different shapes, colors, move in different directions, contain various different information, etc.

Figure 6A:
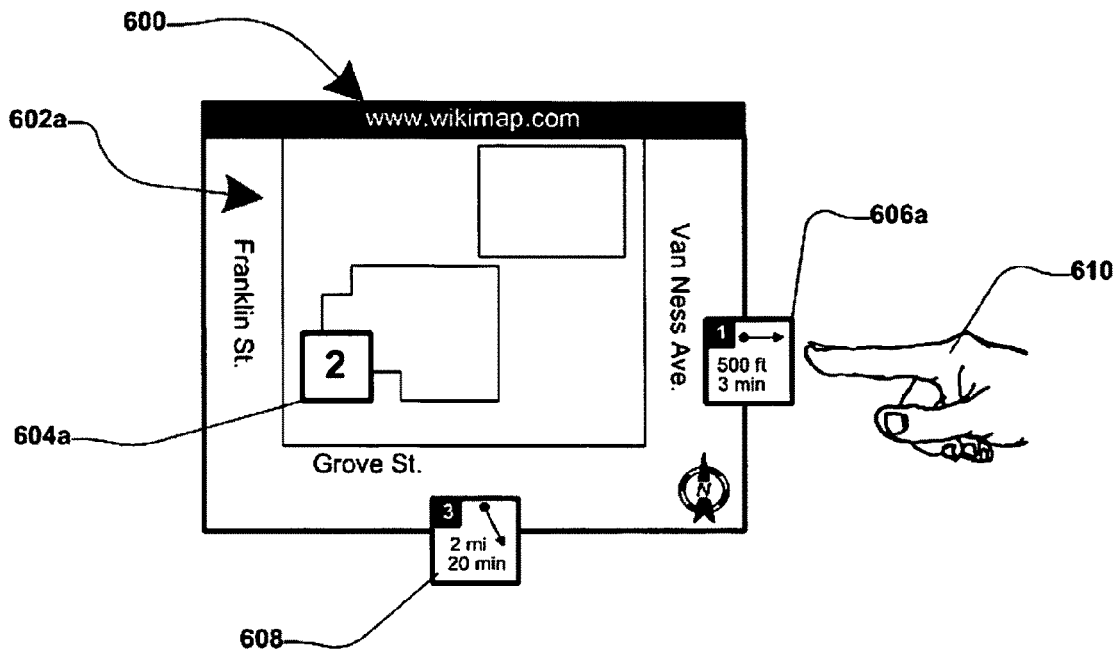
FIGS. 6A and 6B are generalized block diagrams illustrating displaying and utilizing OVIs to move around a map (i.e. pan a map), according to one embodiment of the present invention.
Figure 6B:
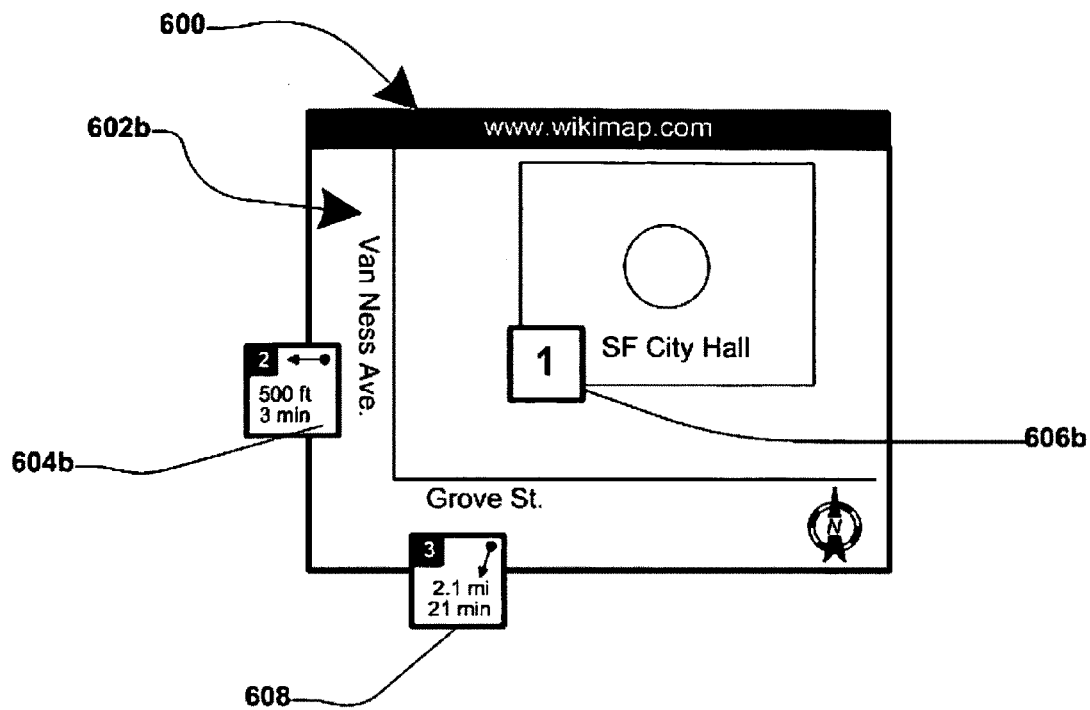

FIGS. 6A and 6B are generalized block diagrams illustrating displaying and utilizing OVIs to move around a map (i.e. pan a map), according to one embodiment of the present invention. Electronic devices, displaying digital maps, commonly allow a user to interface with the map via inputs (e.g. a touch screen, a computer mouse, a keyboard, buttons, voice interface, etc.)

In the presently-preferred embodiment, a MO (e.g. a social-networking related location marker) which is visible to the user on a region of a map, may alter its form to an OVI, referencing the MO, in response to a shift (e.g. a pan) of the region of the map, such that the MO is no longer visible on the region of the map. For example, a location marker may be displayed on a region of a map. The region of the map may shift right, in response to a user's panning the map to the left. The location marker may shift right with the rest of the region of the map, maintaining its geographic position. Once the region of the map has shifted right sufficiently for the location marker to become invisible to the user, the location marker may be replaced with an OVI, referencing the theoretical position of the location marker (now invisible to the user.)

Referring to FIG. 6A, a map-display application 600, running on an electronic device (e.g. a computer, a personal digital assistant, a mobile device, a GPS navigation unit, etc.) may display a map region 602a. The map region 602a may include one or more location markers, such as a location marker "2" 604a. The map-display application may display one or more OVIs, referencing map objects ("MO") that are not visible to the user of the map-display application 600.

In this example, an OVI 608, displayed South/South-East of the location marker "2" 604a, on the periphery of the map region 602a, may contain the information "3, 2 mi, 20 min", referencing a location marker labeled "3" which is 2 miles and a 20 minute travel time, due South/South-East of the location marker "2" 604a. Similarly, an OVI 606a, displayed East of the location marker "2" 604a, on the periphery of the map region 602a, may contain the information "1, 500 ft, 3 min", referencing a location marker labeled "1" which is 500 feet and a 3-minute travel time, due East of the location marker "2" 604a.

In the presently-preferred embodiment, the user may use an input device (e.g. the illustrated "hand/finger" 610, a stylus, a button, a keyboard, a mouse, voice instructions, etc) to select an OVI. Selecting an OVI may cause the map region displayed in the map-display application 600 to pan such that the selected OVI is visible in the new map region displayed. In another preferred embodiment, the new map region may be displayed (i.e. panned to) such that the geographic location indicated by the OVI selected is centered in the new map region displayed. In alternate embodiments, selecting an OVI may pan and zoom a map such that the visible map region includes both the originally-centered location marker and the newly-selected location marker, referenced by the selected OVI.

In this example, selecting the OVI "1" 606a may cause the map region 602a and the OVIs 606a and 608, displayed by the map-display application 600, to change. Referring now to FIG. 6B, in response to the user's selecting (e.g. by clicking on) the OVI "1" 606a, the original map region 602a, displayed by the map-display application 600, may be panned to form a map region 602b. The map region 602b may be centered around the location marker "1" 606b. The location marker "1" 606b may have taken the form of the OVI "1" 606a while outside of the map region 602a.

Accordingly, the location marker "2" 604a. (see FIG. 6A), not visible on the map region 602b, may be referenced by a new OVI "2" 604b, indicating the invisible location marker "2" is 500 ft and a 3-minute-travel time due West from the visible location marker "1" 606b.

When the location maker "1" 606b becomes at the center of the map region 602b, the position OVI "3" 608 and information it contains, may change. In FIG. 6A, while the location marker "2" 604a was at the center of the map region 602a, the OVI "3" 608 displayed a distance of 2 miles, a travel time of 20 minutes and a direction vector of South/South-East. Referring back to FIG. 6B, with the geographic shift (from the map region 602a to the map region 602b) of 500 feet due West from the location marker "2" 604a, to the location marker "1" 606b being at the center of the new map region 602b, the information displayed by the OVI "3" 608 may be change. The OVI "3" 608 may now display a new distance of 2.1 miles, a new travel-time of 21 minutes and a direction vector of South/South-West.

Please note that in this example, the travel-time differences are illustrated as being dependent strictly on vector geometry, whereas in a real implementation of the presently-preferred embodiment of this invention, travel time may vary and be calibrated according to road conditions, traffic patterns, etc.

The panning of a map to display a location marker at the map's center, referenced by a selected OVI, may be accomplished in various ways in different embodiments. In one possible embodiment, the map may instantaneously change from displaying the "original map", with the original location marker at its center, to displaying the "new map", with the location marker referenced by the OVI selected, at the center of the new map. In alternate embodiments, the transition of the map regions displayed may be slowed down and/or animated (please see further discussion of these embodiments in FIGS. 8A-8C and 9A-9C.)

Figure 7:
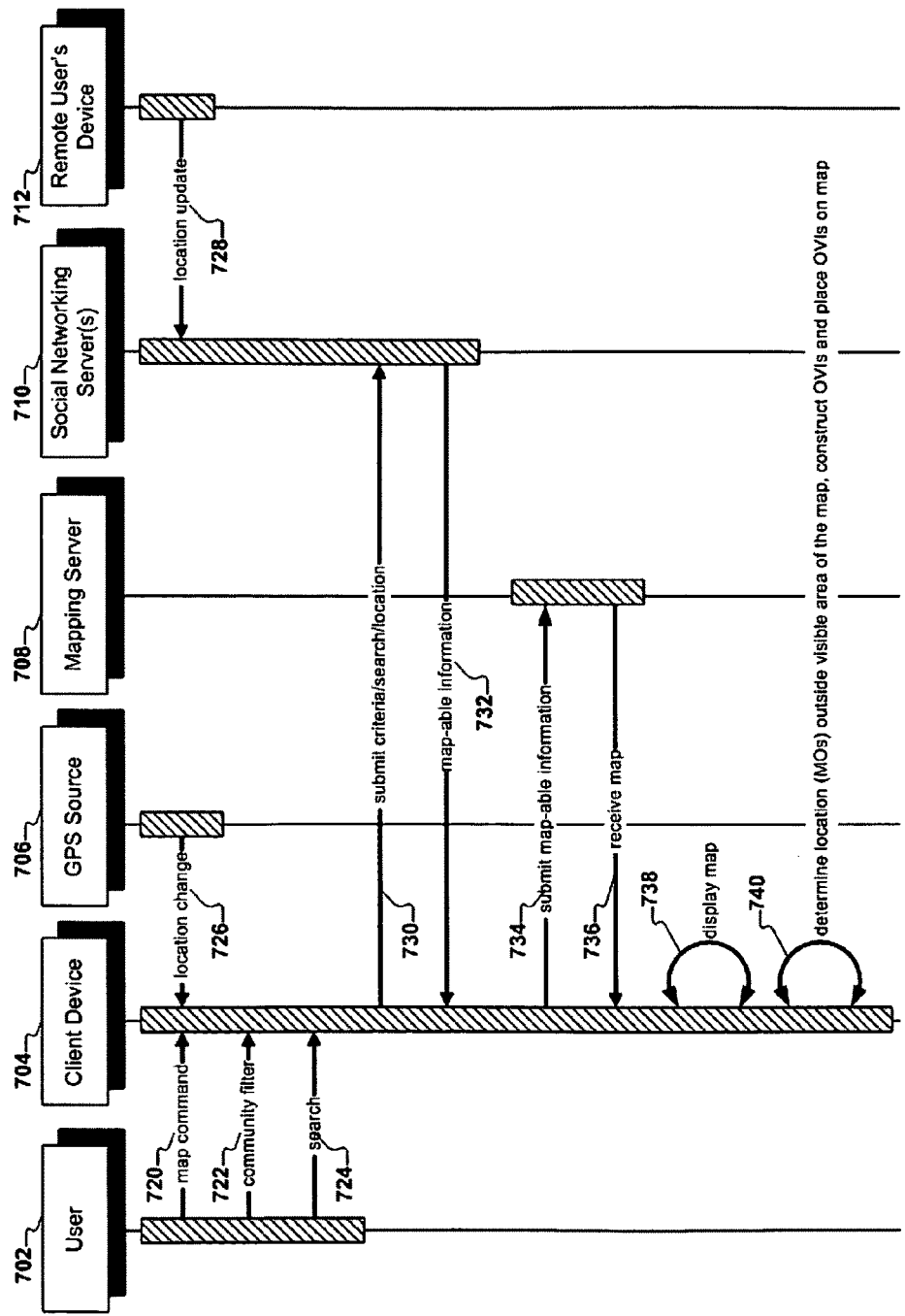
FIG. 7 is a generalize block diagram illustrating various communications between a client device and a social network, allowing a map with OVIs to be created and displayed, according to one embodiment of the present invention

FIG. 7 is a generalize block diagram illustrating various communications between a client device and a social network, allowing a map with OVIs to be created and displayed, according to one embodiment of the present invention. A client device 704 may receive input from a user 702, a GPS source 706, a mapping service 708 and a social network 710. The client device 704 may then display a map and create and display OVIs referencing map objects outside the visible arte of the map.

The client device 704 (e.g. a mobile device, a personal computer, a navigation system, etc.) may receive user input (e.g. via a touch screen, from an input device, via a voice command, etc.) and in response, the client device 704 may display/alter-the-display-of an electronic map. For example, a user may invoke a "map command" 720, instructing the device 704 to display a map. In another example, the user may select a "community filter" command 722, requesting that social-network information be retrieved and re-displayed on a map. In another example, the user may select a "search" command 724, causing the retrieval of new map-able information over the network, and a re-rendering of a map on the client device 702.

The GPS source 706 (which may be external or internal to the client device 704, or may generally be a means for the client device 704 to acquire its geographic location) may transmit geographic coordinates to the client device 704. The client device 704 may transmit its location to the social network 710 (e.g. periodically, in response to an electronic request by the social network 710, in response to a change the in the client device's 704 location, etc.)

The social networking system 710 (e.g. computer servers used by a social network) may aggregate information related to POIs and members. For example, the social network system 710 may contain the geographic locations/coordinate of meetings places, members' residences, etc. A remote user's device 712 may transmit to the social networking system 710 the coordinates of the remote device 712 (i.e. of the user using the remote device 712.) For example, the remote device 712 may be a mobile device that transmits its geographic location to the social networking system 710 (e.g. the transmission may be periodic, invoked by the user of the device, transmitted in response to an event such as a request from the social networking system, etc.)

The client device 704 may transmit an electronic communication 730 to the social network 710. For example, in response to the user's mapping command 720, a change in the user's community filter parameters 722, an update to a search query 724, a change in the location of the client device 726, as an automatic periodic transmission, etc. The social network 710 may transmit map-able information 732 (e.g. locations of social network members, POIs, events, etc.) to the client device 704 (e.g. in response to a transmission 730 from the client device 704, at an automatic periodic interval, in response to a change in any of the map-able information, or in response to any other event.)

In the presently-preferred embodiment, the client device 704 may transmit map-able information 734 to a mapping server 708 and receive back from the mapping server 708 an electronic map 736. The mapping server 708 may be external to the client device 704; or, in alternate embodiments, may be a hardware and/or software component of the client device 704. In alternate embodiments, the mapping server 708 may be part of the social network 710 such that the map is received by the client device 704 from the social network 710.

In the prior art, the client device 704 displays the map 738. Map-able information outside the visible area of the map is not displayed to the user, and is not referenced on the displayed map.

In the presently-preferred embodiment, in addition to displaying the map 738 to the user, OVIs referencing MOs outside the visible area of the map are created and displayed 740. A determination of the MOs, contained in the map-able information 732, outside the map 738, may be made. OVIs referencing the determined MOs may be created. The OVIs may be displayed in association with the displayed map.

In alternate possible embodiments, the process of determining, creating and displaying the OVIs 740 may be divided into smaller processes which may be executed separately from each other. In other embodiments, one or more of the processes may be executed externally to the client device 704 (e.g. by the mapping server 708.)

Figure 8A:
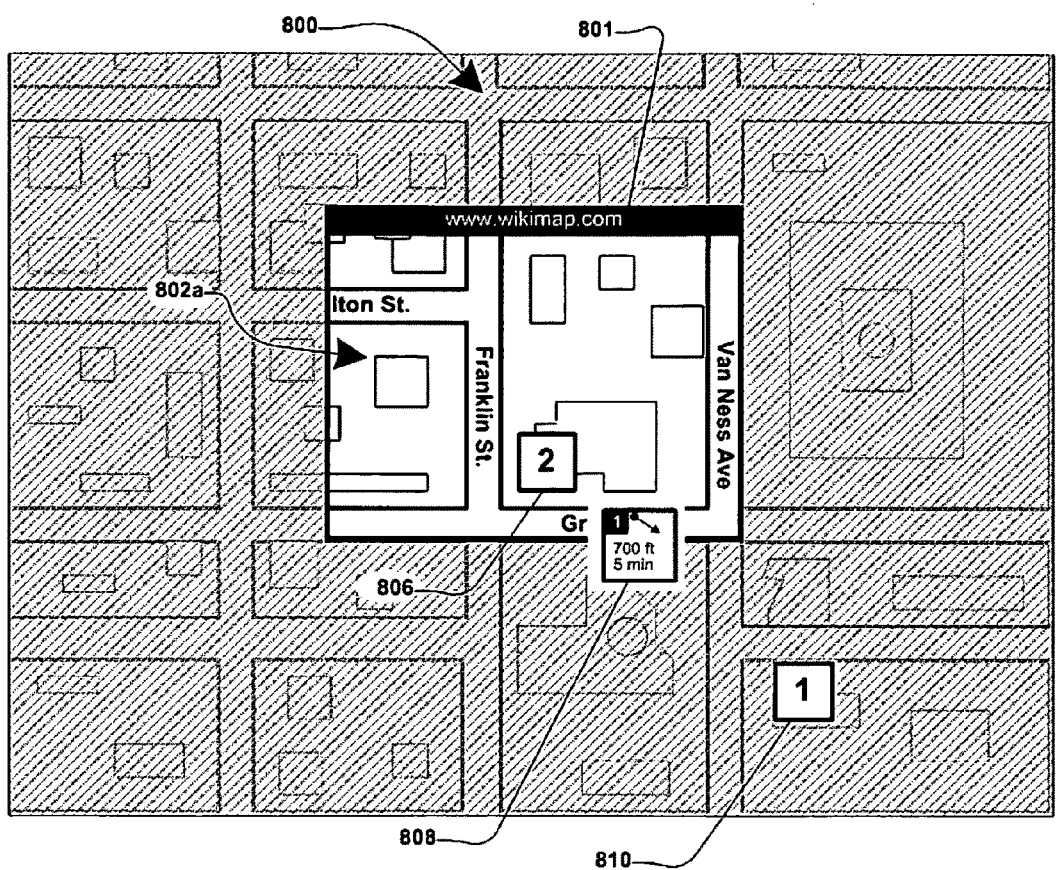
FIGS. 8A, 8B and 8C are generalized block diagrams illustrating displaying object vector indicators ("OVI") and utilizing OVIs to pan around a map in an automated fashion, according to various embodiments of the present invention.
Figure 8B:
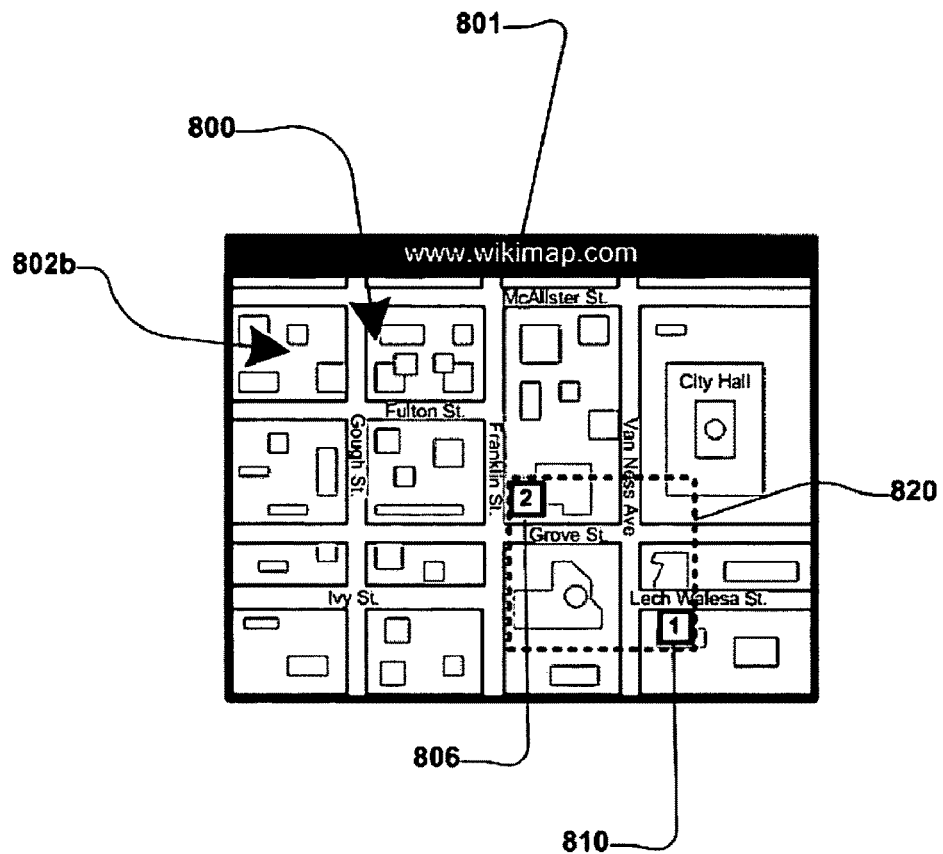
Figure 8C:
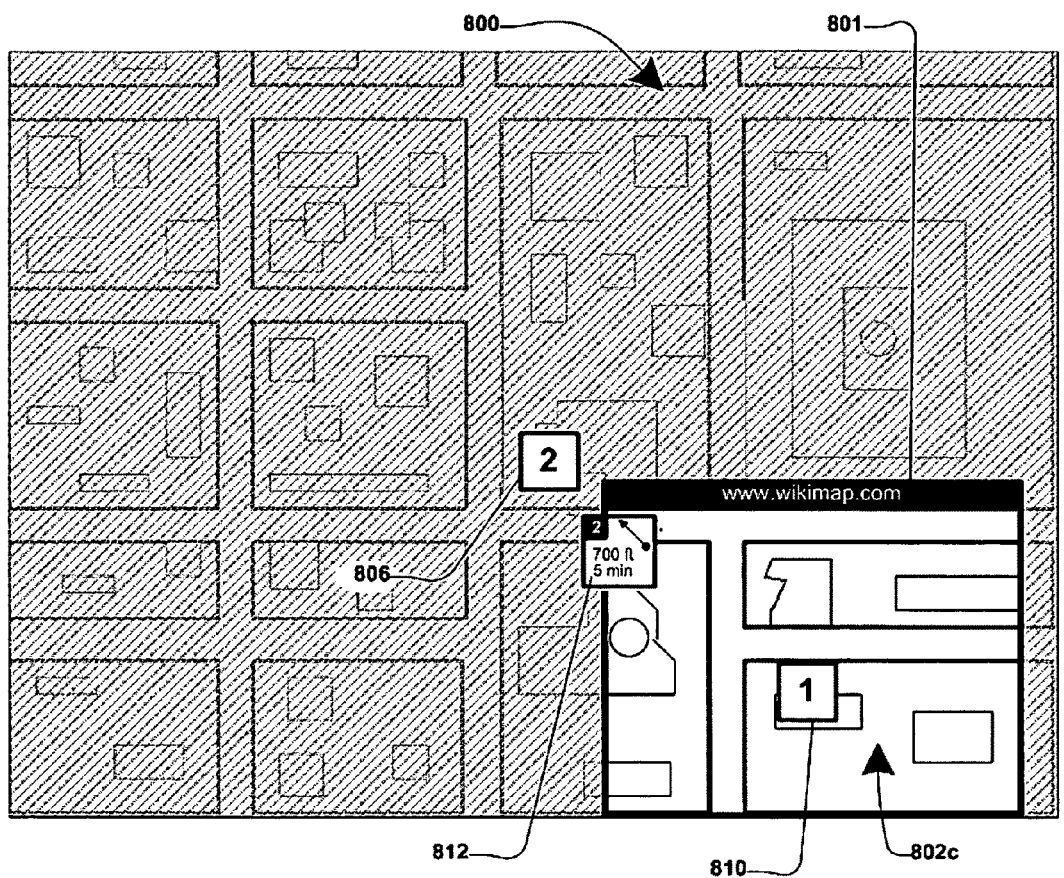

FIGS. 8A, 8B and 8C are generalized block diagrams illustrating displaying object vector indicators ("OVI") and utilizing OVIs to pan around a map in an automated fashion, according various embodiments of the present invention. In response to a user's selection of an OVI, a map-display application may zoom and/or pan the map, transitioning the view from displaying an area including one location marker, to displaying an area including another location marker, referenced by the selected OVI.

Referring to FIG. 8A, a map-display application 801 may display a map-region 802a of a map 800. The map 800 may be invisible to the user, except the area comprising the map-region 802a (the cross-hatching in FIGS. 8A-8C signifies portions of the map 800 not visible to the user.) The dimensions of the map-region 802a may be determined by the zoom level of the map-display application 801, the dimensions of the map-display application 801 etc. The map-region 802a may be the only portion of the map 800 visible to the user, through the map-display application 801. Other portions of the map 800, outside of the map-region 802a, may not be visible to the user. A location marker 810 located on a portion of the map 800 outside of the map-region 802a, may not be visible to the user.

A location marker "2" 806 may be displayed on the map-region 802a, for example, to denote a way-point or landmark in the geographic location corresponding to the location of the location marker 806. One or more remote location markers on the map 800 may not be visible to the user of the map-display application 801. For example, the location marker "1" 810 may not be visible to the user.

OVIs may be displayed in the map-display application 801, indicating to the user the direction—as well as other relevant information, such as distance, travel time, etc.—of the location markers not visible (e.g. the location marker "1" 810.)

In prior art, the user viewing the map-region 802a in the map-display application 801, may not know the direction and distance to the invisible location marker "1" 810. In order to bring the location marker "1" 810 into view in the map-display application 801, the user has to (1) pan the map 800 in the general direction of the location marker 810 until the visible portion of the map 800 includes the location marker 810, and/or (2) zoom out until the visible portion of the map 800 includes the location marker 810, and/or (3) in the case of menu referencing the location marker 810, selecting the reference to the location marker 810 from the menu causing the portion of the map 800 including the location marker 810 to become visible in the map-display application 801.

In the presently-preferred embodiment, the user may select an OVI and in response, the map-display application may perform a series of autonomous steps. The user may select the OVI "1" 808 (e.g. by clicking on it with a pointing device, by touching it through a touch screen, via a voice instruction, etc.) In response, referring now to FIG. 8B, the map-display application 801 may zoom-out and/or pan the map 800, such that the map-region 802b (i.e. the portion of the map 800 displayed through map-display application 801) may include both the location marker "2" 806 and the location marker "1" 810. In an alternate embodiment, the map 800 may be zoomed and/or panned in such manner that the map-display application 801 may display a minimal map-region 820 of the map 800, with the location markers 806 and 810 at its borders (the minimal map-region 820 may be defined as the smallest area of the map 800 inclusive of all location markers, i.e. 806 and 810.)

Referring now to FIG. 8C, the map-display application 801 may display a map-region 802c of the map 800. The map-region 802c may include the location marker 810. In one possible embodiment, the location marker 810 may be centered on the map-region 802c. An OVI 812 may reference (i.e. point to and provide information including distance, travel time, etc.) the location marker "2" 806. The location marker "2" 806 may be invisible in the map-display application 801 in FIG. 8C.

Figure 9A:
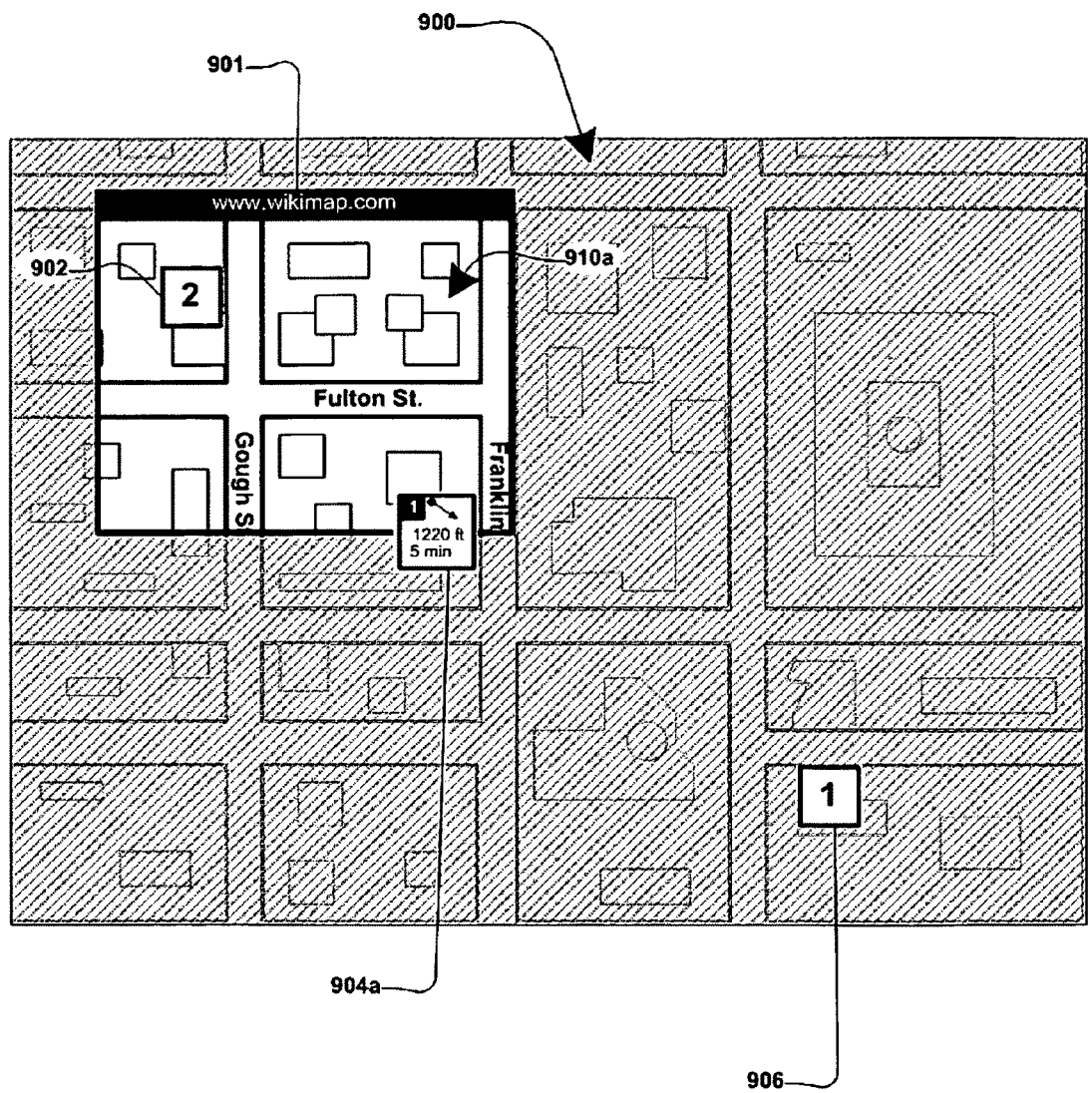
FIGS. 9A, 9B, 9C, 9D and 9E are generalized block diagrams illustrating various methods for transitioning a region of a map displayed, in conjunctions with OVIs, to allow a user to visualize the path between location markers, according to various embodiments of the present invention.
Figure 9B:
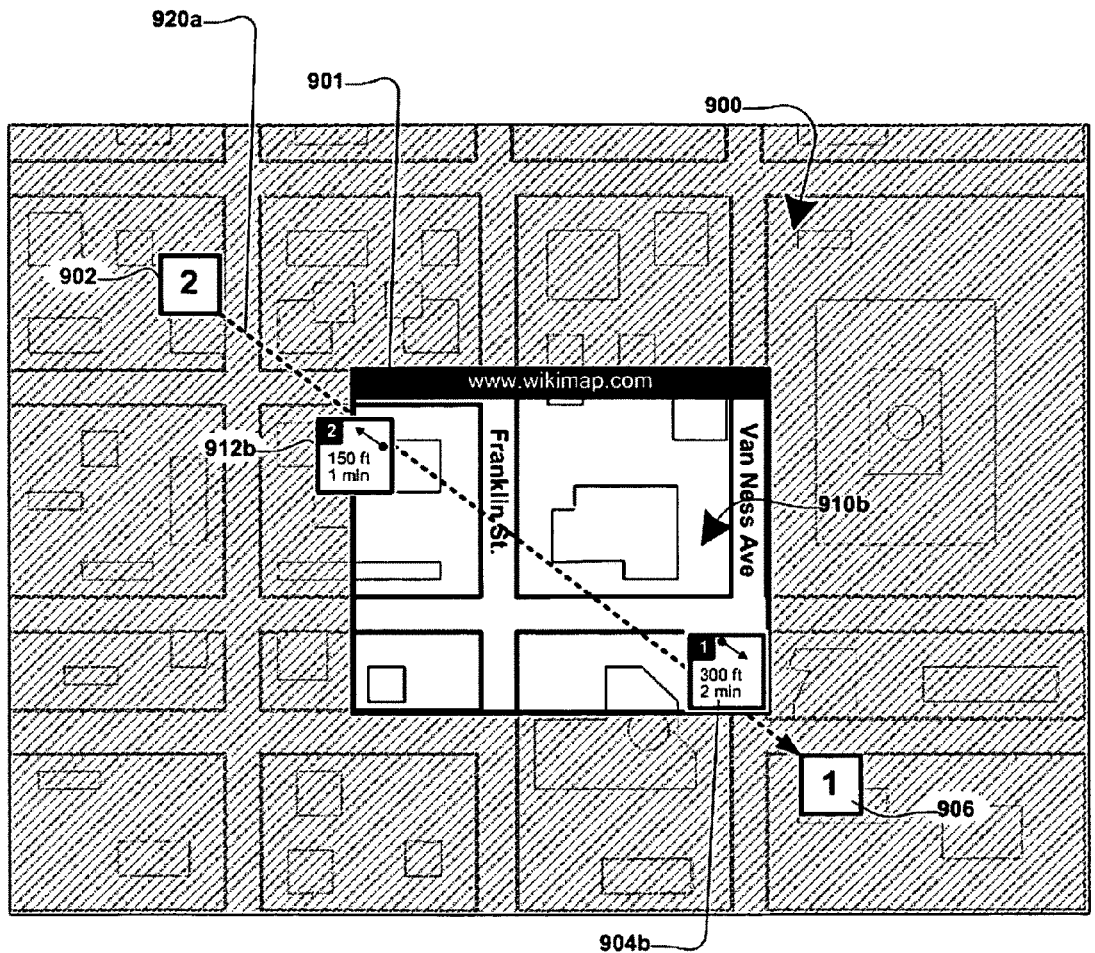
Figure 9C:
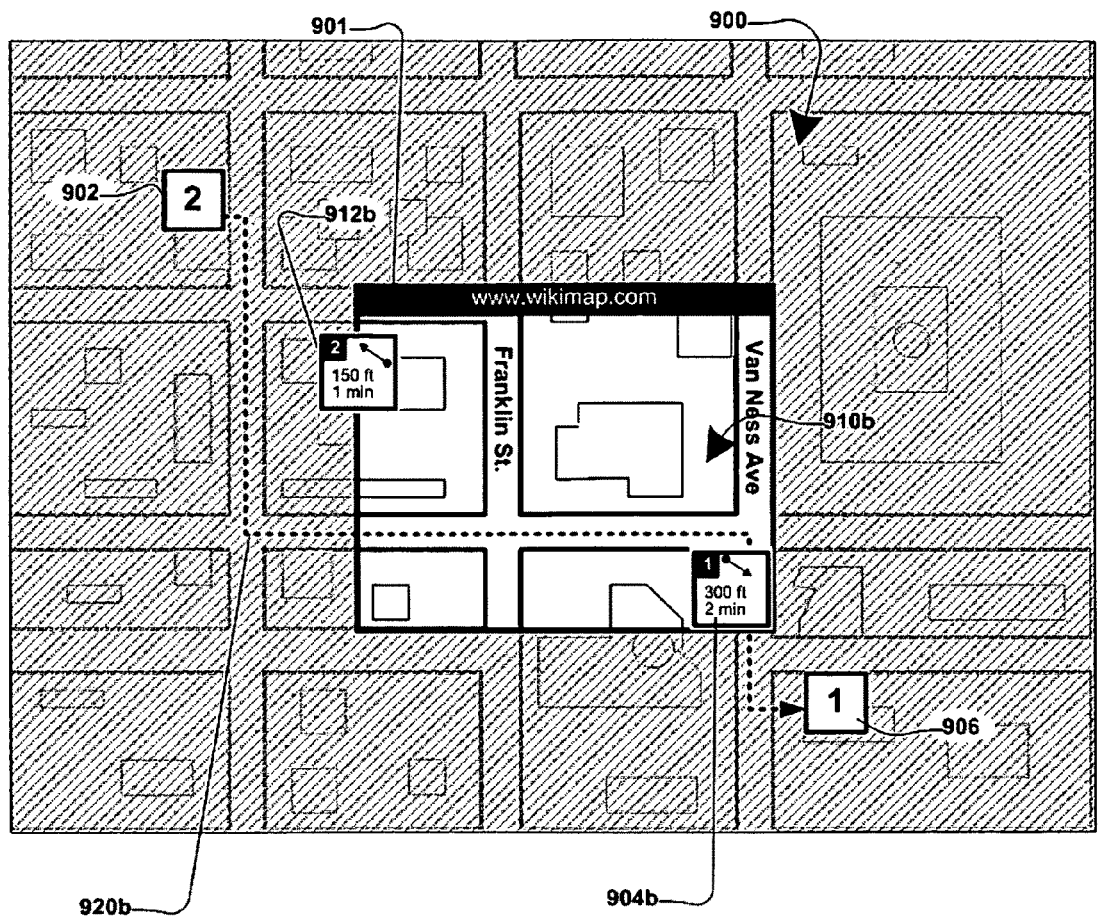

Please note that the examples in FIGS. 8A-8C show three distinct states: a map showing one location marker and one OVI, a map showing both location markers and no OVIs, and a map showing the other location marker and another OVI, pointing to the first location marker. These three distinct states are used for illustrative purposes only. In a preferred implementation, more states may be possible and the transition from one state to the next may be gradual, animated and/or time-delayed. For example, a user clicking on an OVI on a map, containing a location marker, may cause the map to slowly zoom and/or pan until the location marker referenced by the OVI is visible, in addition to the first location marker. The map may then proceed to zoom and/or pan such that the original location marker is no longer visible but is referenced by a new OVI, and the location marker referenced by the first OVI, is visible. FIGS. 9A-9C illustrate other methods of visual map transition in alternate embodiments.

FIGS. 9A, 9B, 9C, 9D and 9E are generalized block diagrams illustrating various methods for transitioning a region of a map displayed, in conjunctions with OVIs, to allow a user to visualize the path between location markers, according to various embodiments of the present invention. In response to a user's selection of an OVI, a map-display application may zoom and/or pan the map, transitioning the view from displaying a map-region including one location marker, to displaying a map-region including another location marker, referenced by the selected OVI. The map-display application transition may follow various geographic routes and may automatically return to displaying the initial map-region.

Referring to FIG. 9A, a map-display application 901 may display a map-region 910a of a map 900, which may be invisible to the user (the cross-hatching in FIGS. 9A-9E signifies portions of the map 900 not visible to the user through the map-display application 901.) The map-display application 901 may contain a location marker "2" 902, displayed overlaying the map-region 910a, and an OVI "1" 904a. The OVI 904a may reference a remote location marker "1" 906, outside the visible map-display region 910a. The map 900 may be a street map, a satellite image or any other type of electronic map.

In response to a user's input selecting the OVI 904a (e.g. via a touch screen, via an electronic imputer device, via voice-activation, etc.) an automatic transition of the region of the map 900 displayed by the map-display application 901, may be initiated. The transition may help the user visualize the geography and path from the location marker "2" 902 visible to the user, to the remote location marker "1" 906, invisible to the user and referenced by the OVI "1" 904a.

Figure 9D:
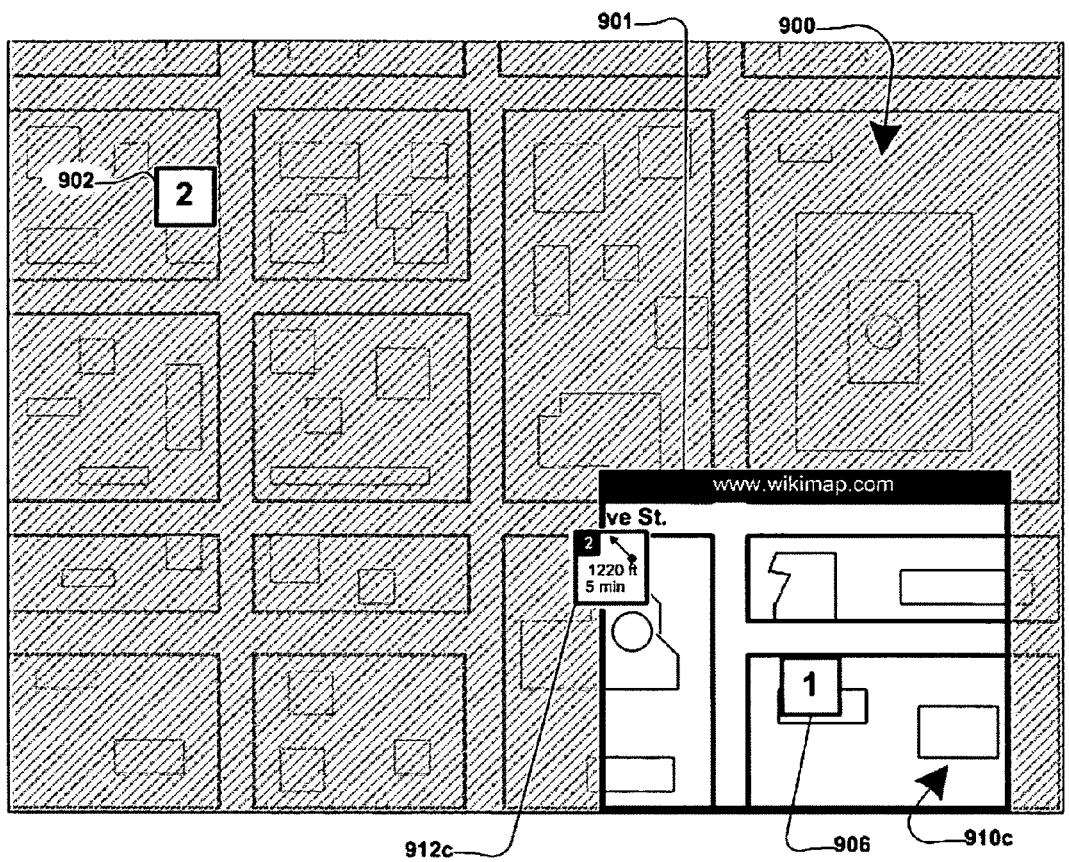

In one possible preferred embodiment, illustrated by sequence in FIGS. 9A, 9B and 9D, the transition may be along a linear path. In this embodiment, the visible region of the map 900, shown in the map-display application 901, may transition along a straight geographic path. In alternate embodiments, described in the sequence of FIGS. 9A, 9C and 9D, the transition may follow a street-path.

Referring now to FIG. 9B, the map 900 may be transitioned through the map-display application 901 along a straight imaginary line 920a, from the location marker "2" 902 to the location marker "1" 906. Throughout the transition of the map 900, the location marker "2" 902 and the location marker "1" 906, remain known to the user (i.e. the user is aware of the locations of these location markers, whether or not they are visible on the portion of the map shown in the map-display application.) In a case where the transition causes the map-display application 901 to display a map-region 910b which does not include the location markers, OVIs may be displayed. For example, the map-region 910b does not include the location makers 902 and 906, so an OVI 912b may be displayed with information referencing the invisible location marker 902 and an OVI 904b may be displayed with information referencing the invisible location marker 906. The OVIs 904b and 912b may be displayed in a positioning aligning them with the imaginary line of transition 920a.

Referring now to FIG. 9C, in an alternate embodiment, the map 900 may be transitioned through the map-display application 901 along a path 920b resembling real-life travel routes. For example, the path 920b may follow a route recommended by a guidance service (e.g. a GPS navigation device, a mapping website enabled for computing and displaying directions, etc.) In various other embodiments, the user may be offered to choose from one or more alternative routes. The routes may be computed based on real-time road and traffic conditions, etc. The speed with which the map 900 is transitioned within the map-display application 901 may be animated to mimic real travel conditions. For example, the transitioning effect may be halted briefly when the path 920b passes through a stop-sign or traffic light, etc.

Throughout the transitioning effects described in FIGS. 9B and 9C, information displayed in the OVIs may be updated in real time. For example, referring to FIG. 9C, as the map 900 transitions left, simulating the user traveling right along the path 920b (i.e. away from the location marker 902), the OVI "2" 912b may display a changed direction, increased distance and increased travel-time with respect to the location marker "2" 902 the OVI "2" 912b is referencing. Likewise, the OVI "1" 904b may display a changed direction, decreased distance and decreased travel-time with respect to the location marker "1" 906 the OVI "1" 904b is referencing.

Please note that in these examples, the travel-time change may be affected by real-time road conditions, as well as the decreased distance. In addition, please note that a map said to be traveling in a certain direction is a figure of speech-one may imagine the map being static and the map-display application shifting its view of the map causing the region of the map displayed by the map-display application to transition.

Referring now to FIG. 9D, the transition may end when a new map-region 910c, containing the location marker "1" 906, is displayed in the map-display application 901. In the presently-preferred embodiment, the map-region 910c may be selected from map 900 in such manner as to center around the location marker "1" 906. The location marker "2" 902, visible to the user in the map-region 910a in FIG. 9A, may not be visible to the user in the map-region 910c. The location marker "2" 902 may be referenced by an OVI "2" 912c, providing the user with a visual indication of the distance from, direction to and travel-time to the invisible location maker "2" 902.

Figure 9E:
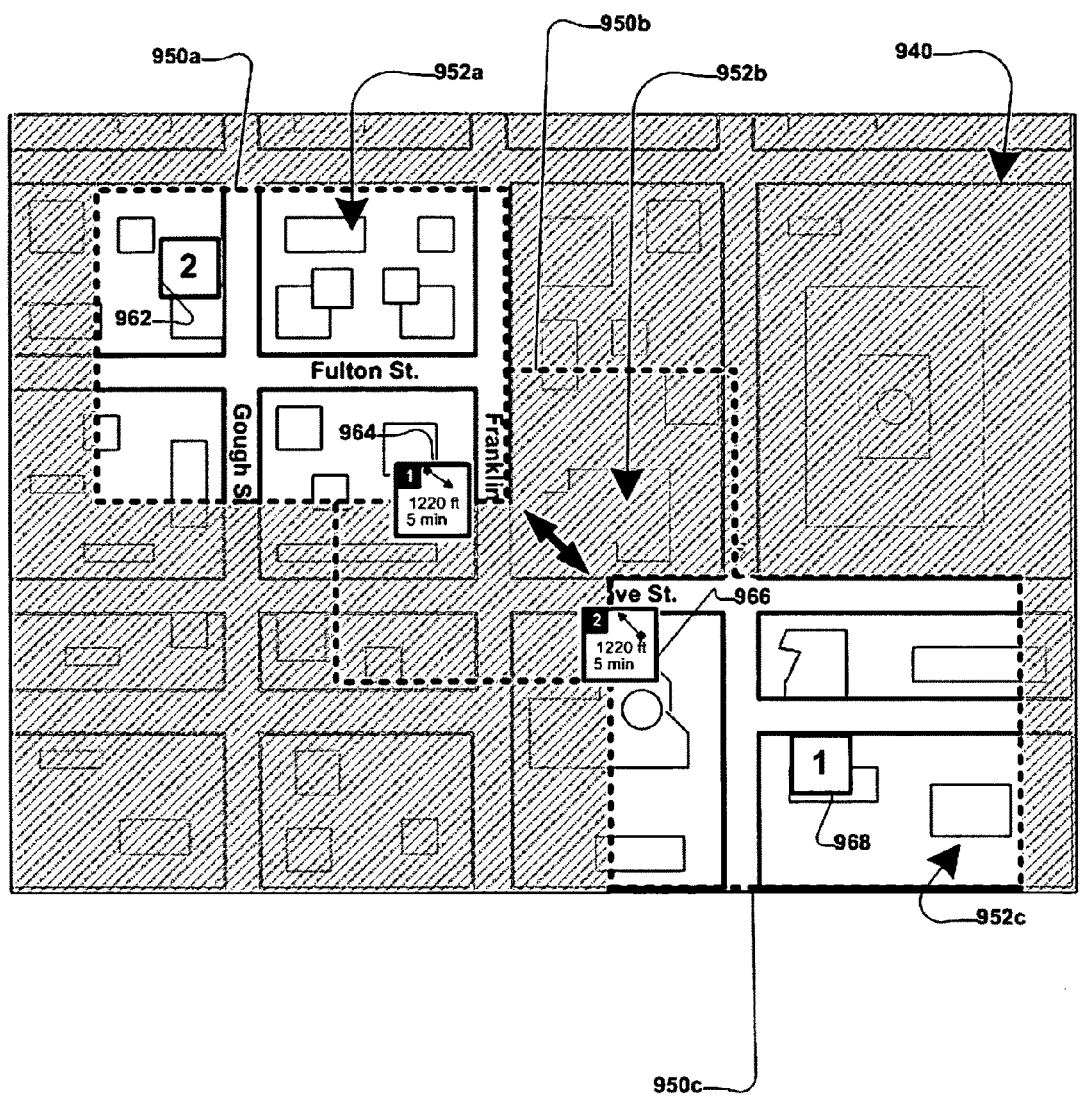

Referring now to FIG. 9E, in another embodiment, the user may be shown a simulation of travel from a visible location marker in a map-region, to an invisible location marker referenced by an OVI, and back to the original map-region showing the original location marker. For example, in a "glance mode", a region of a map, containing one or more location markers, may be visible to the user through a map-display application. Also displayed by the map-display application may be one or more OVIs referencing location markers outside the visible region of the map. The user may select one of the OVIs, in response to which the map may automatically transition within the map-display application, shifting the view of the map towards the location marker referenced by the selected OVI, and, after a possible short pause, transitioning the map in reverse back to the original view. One of the advantages of this embodiment is in giving the user a quick perspective on where another remote location marker is and how to get there, without permanently deviating from the current map view.

In this example, three phases of a map-display application are shown: a first phase where a first location marker is visible and a second location marker is not visible, and is referenced by an OVI; a second phase where neither location marker is visible and both location markers are visible by OVI; and a third phase where the first location marker is not visible and is referenced by an OVI, while the second location marker is visible. Please note that these three phases represent three arbitrary points in the transition of a map through a map-display application, and in a real-life implementation the transition may involve hundreds of phases, creating the illusion of a smooth, animated panning of a map along a travel route. In addition, please note that in this example the "travel direction" of the map is linear, whereas in other embodiments the map may transition along a travel route following streets and roads.

In the first phase, a map-display application 950a may display a map-region 952a of a map 940. The map 940 may not be visible to the user other than its map-region 952a, visible through the map-display application 950a. The map-region 952a may include a location marker "2" 962, visible to the user. The map-region 952a may include an OVI "1" 964, referencing a location marker "1" 968, not visible to the user through the map-display application 950a.

In response to a user's selecting the OVI "1" 964, an automatic map-display animation sequence may take place. The transition in the animation sequence may include one or more in-between map regions. In the second phase, the map-display application is designated 950b and may include a different region of the map 940, designated as a map-region 952b. The map-region 952b may include OVIs referencing the location markers 962 and 968, not visible in the map-region 952b.

The third phase may illustrate the final state of the map-display application, designated as 950c. The map-display application 950b may include a different region of the map 940, designated as a map-region 952c. The map-region 952c may include an OVI "2" 966 referencing the location marker "2" 962, not visible in the map-region 952c. At the end of the last phase (in this example the thirst phase) the animation sequence may reverse and the phases may be displayed in reverse order, with the last phase being the first phase where the map-display application was designated 950a and displayed the map-region designated 952a.

In an alternate embodiment, a short pause may follow the last phase, prior to the animation sequence being traversed in reverse order. In another alternate embodiment, no reverse traversing of phases may take place. For example, upon reaching the last phase a short pause may take place, in the original map-region may be displayed in the map-display application.

While the invention has been described herein with reference to certain preferred embodiments, these embodiments have been presented by way of example only, and not to limit the scope of the invention. Accordingly, the scope of the invention should be defined only in accordance with the claims that follow.

What is claimed is:

1. A method for displaying object vector indicators ("OVI") referencing social-network map-objects ("MO") on an electronic map, comprising:
   providing an electronic device having a map-display application that is coupled to a mapping service, a social-network and a display for displaying a selected area of the electronic map;
   authenticating to the social network;
   obtaining from the social network the MO;
   determining that coordinates of the MO are not within the selected area of the electronic map;
   computing distance and travel-related information from a location within the selected area of the electronic map to the MO;
   computing a placement position of an OVI referencing the MO on the map-display application;
   creating the OVI containing the distance and travel-related information;
   displaying the OVI on the display at the computed placement position;
   receiving user input selecting the OVI;
   displaying a secondary area of the electronic map, wherein the secondary area is a region of the electronic map centered approximately around the MO; and
   displaying the MO approximately at the center of the secondary area.

2. The method of claim 1, wherein the location within the selected area of the electronic map is the center of the selected area of the electronic map.

3. The method of claim 1, wherein the location within the selected area of the electronic map is a location marker.

4. The method of claim 3, wherein the location marker is retrieved from the social network.

5. The method of claim 4, further including retrieving from the social network location information associated with a user of the social network, wherein the location market is related to the retrieved location information.

6. The method of claim 1, wherein the computing the placement position of the OVI step is repeated in response to a change in the position of the MO.

7. The method of claim 1, wherein the computing the placement position of the OVI step is repeated in response to a change in the position of the electronic device.

8. The method of claim 1, wherein the computing the distance-and-travel information includes at least one of the following: an aerial distance to the MO, a travel distance to the MO, a visual indicator pointing in the direction of the MO, and an estimated travel-time to the MO.

9. The method of claim 8, wherein the travel-distance to the MO is computed by selecting a travel route according to various user preferences and travel-route selection algorithms.

10. The method of claim 8, wherein the estimated travel-time to the MO is computed by selecting a travel route according to various user preferences and travel-route selection algorithms.

11. The method of claim 8, wherein the received user input is result of the user touching the display at a location of the display approximately corresponding to the OVI displayed.

12. The method of claim 1, wherein the computing distance-and-travel information step is repeated in response to a change in the position of the electronic device.

13. The method of claim 1, wherein the computing distance-and-travel information step is repeated in response to a change in the position of the MO obtained from the social network.

14. The method of claim 1, wherein the computing distance-and-travel information step and the computing the placement position of the OVI step are repeated in response to a change in travel conditions.

15. The method of claim 1, wherein the computing distance-and-travel information step further comprises:
   obtaining position of the electronic device;
   transmitting the position of the electronic device to a remote server; and
   receiving from the remote server the distance-and-travel information.

16. The method of claim 1, further including:
computing distance and travel-related information from the OVI to the selected area of the electronic map;
computing a placement position of a second OVI referencing the selected area of the electronic map;
creating the second OVI including the distance and travel-related information;
displaying the second OVI on the display at the computed placement position.

17. The method of claim 1, wherein the electronic device is a GPS-enabled navigation unit.

18. A method of panning a social-network-based electronic map, comprising:
authenticating to a social network;
requesting a list of map objects ("MOs") from the social network;
receiving the list of MOs from the social network;
determining the geographic coordinates of the MOs; and
determining that the MOs are outside bounds of a first area of the map visible to a user;
creating an object vector indicator ("OVI") for each of the MOs;
displaying the OVIs on the electronic map;
receiving user input selecting one of the OVIs;
determining one of the MOs referenced by the selected OVI;
panning the electronic map to display a secondary area of the map, wherein the secondary area is a region of the electronic map encompassing the determined one of the MOs; and
wherein the determined one of the MOs is approximately at the center of the secondary area.

19. The method of claim 18, further comprising animating the panning transition of the electronic map from displaying the first area to displaying the secondary area, wherein the animation includes the steps of
a. defining a number of animation steps;
b. defining a time delay;
c. defining a small travel distance;
d. determining a path between the determined one of the MOs and an approximate center of the first area of the map;
e. panning the map by the small travel distance in the direction of the determined one of the MOs;
f. waiting an amount of time specified by the time delay;
wherein the steps e-f are repeated until the determined one of the MOs is approximately at the center of the displayed secondary map.

20. The method of claim 18, wherein creating an OVI includes calculating a distance, a direction and a travel time from a point in the first area of the map to the location of the MO.

21. The method of claim 20, wherein the point in the first area of the map corresponds to the location of the electronic device.

22. The method of claim 18, wherein the step of panning the map by a small interval further includes:
defining a travel route; and
panning the map along the defined travel route.

23. A method for creating and displaying an object vector indicator ("OVI") on an electronic map of a global navigation system ("GPS") device, connected to a social network, comprising:
a) providing the GPS device having a map display application that is coupled to the social network and a display for displaying a portion of the electronic map;
b) receiving coordinates of the GPS device;
c) receiving information on a map-object ("MO");
d) determining coordinates of the MO from the received information;
e) determining a range of coordinates inclusive of the displayed portion of the electronic map;
f) calculating that the coordinates of the MO are not within the range of coordinates of the displayed portion of the electronic map;
g) creating the OVI to reference the MO;
h) calculating the placement of the OVI on the display;
i) displaying the OVI on the display;
j) receiving user input selecting the OVI; and
k) panning the electronic map such that the MO is displayed approximately at the center of the electronic map.

24. The method of claim 23, wherein the step of creating the OVI includes:
calculating the direction, distance and travel-time from the position of the electronic device to the MO; and
including the calculated data in the OVI.

25. The method of claim 23, further comprising:
changing at least one of GPS coordinates of the GPS device; MO information; a zoom-level of the electronic map.

26. The method of claim 23, wherein the social network is capable of providing mapping information.

* * * * *